(12) United States Patent
Bellare et al.

(10) Patent No.: US 11,790,020 B2
(45) Date of Patent: *Oct. 17, 2023

(54) SYSTEM AND METHOD FOR DELIVERY OF CONTENT BASED ON MATCHING OF USER PROFILES WITH CONTENT METADATA

(71) Applicant: ORACLE INTERNATIONAL CORPORATION, Redwood Shores, CA (US)

(72) Inventors: Kiran Bellare, Los Altos, CA (US); Hareesh S. Kadlabalu, Plainview, NY (US); Kamal Kapur, New York, NY (US); David Jones, Colorado Springs, CO (US); David Kamholz, Westcliffe, CO (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/732,086

(22) Filed: Apr. 28, 2022

(65) Prior Publication Data
US 2022/0253497 A1    Aug. 11, 2022

Related U.S. Application Data

(63) Continuation of application No. 16/785,370, filed on Feb. 7, 2020, now Pat. No. 11,341,199.
(Continued)

(51) Int. Cl.
*G06F 16/00* (2019.01)
*G06F 16/9535* (2019.01)
(Continued)

(52) U.S. Cl.
CPC ........ *G06F 16/9535* (2019.01); *G06F 16/951* (2019.01); *G06F 40/30* (2020.01); *G06Q 30/0631* (2013.01)

(58) Field of Classification Search
CPC .......................... G06F 16/9535; G06F 16/951
(Continued)

(56) References Cited

U.S. PATENT DOCUMENTS 6,853,982 B2    2/2005    Smith
7,933,956 B2    4/2011    Hon
(Continued)

FOREIGN PATENT DOCUMENTS

WO    2016044741    3/2016

OTHER PUBLICATIONS

Abbar, Sofiane; "Personalized Access Model For Content Delivery Platforms: Concepts, Techniques and Algorithms", PRiSM Lab, University of Versailles, May 11, 2010, 1 page.
(Continued)

*Primary Examiner* — Chelcie L Daye
(74) *Attorney, Agent, or Firm* — TUCKER ELLIS LLP

(57) ABSTRACT

In accordance with an embodiment, described herein is a system and method for delivery of content based on matching of user profiles with content metadata. The system enables delivery of personalized content, without the overhead of managing segment targeting rules, while providing content publishers or marketers with complete control over such personalization. A recommendation service or application program interface, provided by a computer, cloud computing environment, or other type of computer system, enables receipt and processing of requests, from client devices, for personalized content. A recommendation engine delivers content assets in response to a request from a client device. The recommendation engine determines a content
(Continued)

channel and a user identity associated with the request, and then delivers content assets based on rules governing the matching of content asset metadata with the user profile. While content classification evolves over time, so also does the personalization of delivered content.

20 Claims, 23 Drawing Sheets

Related U.S. Application Data

(60) Provisional application No. 62/803,201, filed on Feb. 8, 2019.

(51) Int. Cl.
*G06Q 30/0601* (2023.01)
*G06F 16/951* (2019.01)
*G06F 40/30* (2020.01)

(58) Field of Classification Search
USPC .......................................................... 707/734
See application file for complete search history.

(56) References Cited

U.S. PATENT DOCUMENTS

| | | | |
|---|---|---|---|
| 8,515,941 B1 | 8/2013 | Avritch | |
| 8,849,847 B2 | 9/2014 | Eustace | |
| 9,177,060 B1 | 11/2015 | Bennett | |
| 9,742,871 B1 | 8/2017 | Gibson | |
| 10,133,812 B2 | 11/2018 | Lee | |
| 11,341,199 B2 | 5/2022 | Bellare | |
| 2002/0010625 A1 | 1/2002 | Smith | |
| 2007/0174180 A1 | 7/2007 | Shin | |
| 2007/0198534 A1 | 8/2007 | Hon | |
| 2008/0139112 A1 | 6/2008 | Sampath | |
| 2010/0251305 A1* | 9/2010 | Kimble | H04N 7/17318 725/46 |
| 2011/0191366 A1* | 8/2011 | Eustace | H04L 67/02 715/752 |
| 2012/0185892 A1 | 7/2012 | Camplejohn | |
| 2013/0090163 A1 | 4/2013 | Edson | |
| 2014/0012671 A1* | 1/2014 | Ye | G06Q 30/0251 705/14.57 |
| 2014/0156681 A1 | 6/2014 | Lee | |
| 2020/0257748 A1 | 8/2020 | Bellare | |

OTHER PUBLICATIONS

Weis, et al., "A User Profile-based Personalization System for Digital Multimedia Content", 3rd International Conference on Digital Interactive Media in Entertainment and Arts, Sep. 2008, pp. 281-288, 8 pages.

Weis, et al., "A User Profile-based Personalization System for Digital Multimedia Content", 3rd International Conference on Digital Interactive Media in Entertainment and Arts, Sep. 2008, Abstract, retrieved from https://www.researchgate.net/publication/221038808_A_user_profile_based_personalization_system_for_digital_multimedia_content on Mar. 13, 2019, 5 pages.

* cited by examiner

Add Profile Attribute

Select a profile attribute and click add to recommendation. Select drag handle to drag and drop attribute to reorder the priority.

| Priority | Attribute | Count | Customers | Success Stories | Case Study | Remove |
|---|---|---|---|---|---|---|
| 1 | Industry | 45 | 4,325 | 35 | 65 | × |
| 2 | Product | 45 | 2,693 | 12 | 45 | × |

Country [Add]

Create Profile Attribute

Content and Experiences Cloud

Profile Attributes > Create Profile Attribute

Name *
Enter Name

Description
Enter Description

Profile Source
Custom Attribute

Parameter Name *
Enter Name

Taxonomy Category
Category          Taxonomy

No Taxonomies Selected

Add

Taxonomy Options
Use when no content is available at the matching node.

☑ Use content at parent node    2 Levels Up
☑ Use content at sibling node

- Documents
- Conversations
- Sites
- Assets
- Developer
- Analytics
- Administration
- Settings
- Assets
- Integrations

Content and Experiences Cloud

Create Profile Attribute

Profile Attributes > Create Profile Attribute

Name *
Enter Name

Description
Geographic information on sales regions

Profile Source
Custom Attribute

Parameter Name (API Key) *
Enter Name

Content: Meta Data Type
Content Data Fields

| Content Data Fields |
|---|
| Taxonomy |

No Meta Data Defined Yet
Add a content meta data mapping between a content type and data field.

- Documents
- Conversations
- Sites
- Assets
- Developer
- Analytics
- Administration
- Settings
- Assets
- Integrations

SYSTEM AND METHOD FOR DELIVERY OF CONTENT BASED ON MATCHING OF USER PROFILES WITH CONTENT METADATA

CLAIM OF PRIORITY

This application is a continuation of U.S. patent application titled "SYSTEM AND METHOD FOR DELIVERY OF CONTENT BASED ON MATCHING OF USER PROFILES WITH CONTENT METADATA", application Ser. No. 16/785,370, filed Feb. 7, 2020; which claims the benefit of priority to U.S. Provisional Patent Application titled "SYSTEM AND METHOD FOR DELIVERY OF CONTENT BASED ON MATCHING OF USER PROFILES WITH CONTENT METADATA", Application No. 62/803,201, filed Feb. 8, 2019; each of which above applications and the contents thereof are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to systems and methods for delivery of content in association with online, web, mobile, or other types of computer environments, and are particularly related to delivery of personalized content based on a matching of user profiles with content metadata.

BACKGROUND

Some content targeting systems, as may be implemented in association with online, web, mobile, or other e-commerce or computer environments, operate by allowing a definition of target segments of users, and then targeting particular data or content to those segments.

For example, in one approach, a number of target segments can be created using conditional segment targeting rules, that are then applied to each user's profile attributes.

However, such an approach does not scale well with an increasing number of target segments. In particular, as the number of target segments increases, with users potentially belonging to multiple different segments, it becomes increasingly difficult for, say, a business user to determine which particular content to associate with which particular segment. This shortcoming is particularly evident in environments where the target content is continually being updated, where the user profiles continually evolve, or where the target segments are continually being redefined.

An alternative approach to content targeting is to employ content targeting models that are largely driven by computer machine-learning. With this approach, content publishers or marketers generally defer control of determining the specific content to be presented to each user persona, and instead allow a computer itself to make such decisions.

However, the quality of the recommendations that are provided using a machine-learning approach is largely reliant on the amount of trial data which was previously gathered and used to train the machine-learning models. The approach also suffers from an inherent delay in the time it takes for the system to learn from, and respond to, aggregate user behavior.

SUMMARY

In accordance with an embodiment, described herein is a system and method for delivery of content based on matching of user profiles with content metadata. The system enables delivery of personalized content, without the overhead of managing segment targeting rules, while providing content publishers or marketers with complete control over such personalization. A recommendation service or application program interface, provided by a computer, cloud computing environment, or other type of computer system, enables receipt and processing of requests, from client devices, for personalized content. A recommendation engine delivers content assets in response to a request from a client device. The recommendation engine determines a content channel and a user identity associated with the request, and then delivers content assets based on rules governing the matching of content asset metadata with the user profile. While content classification evolves over time, so also does the personalization of delivered content.

BRIEF DESCRIPTION OF THE DRAWINGS

FIG. 14 illustrates another example of a graphical user interface, and usage thereof, for use with a system for delivery of content, in accordance with an embodiment.

Figure 15:
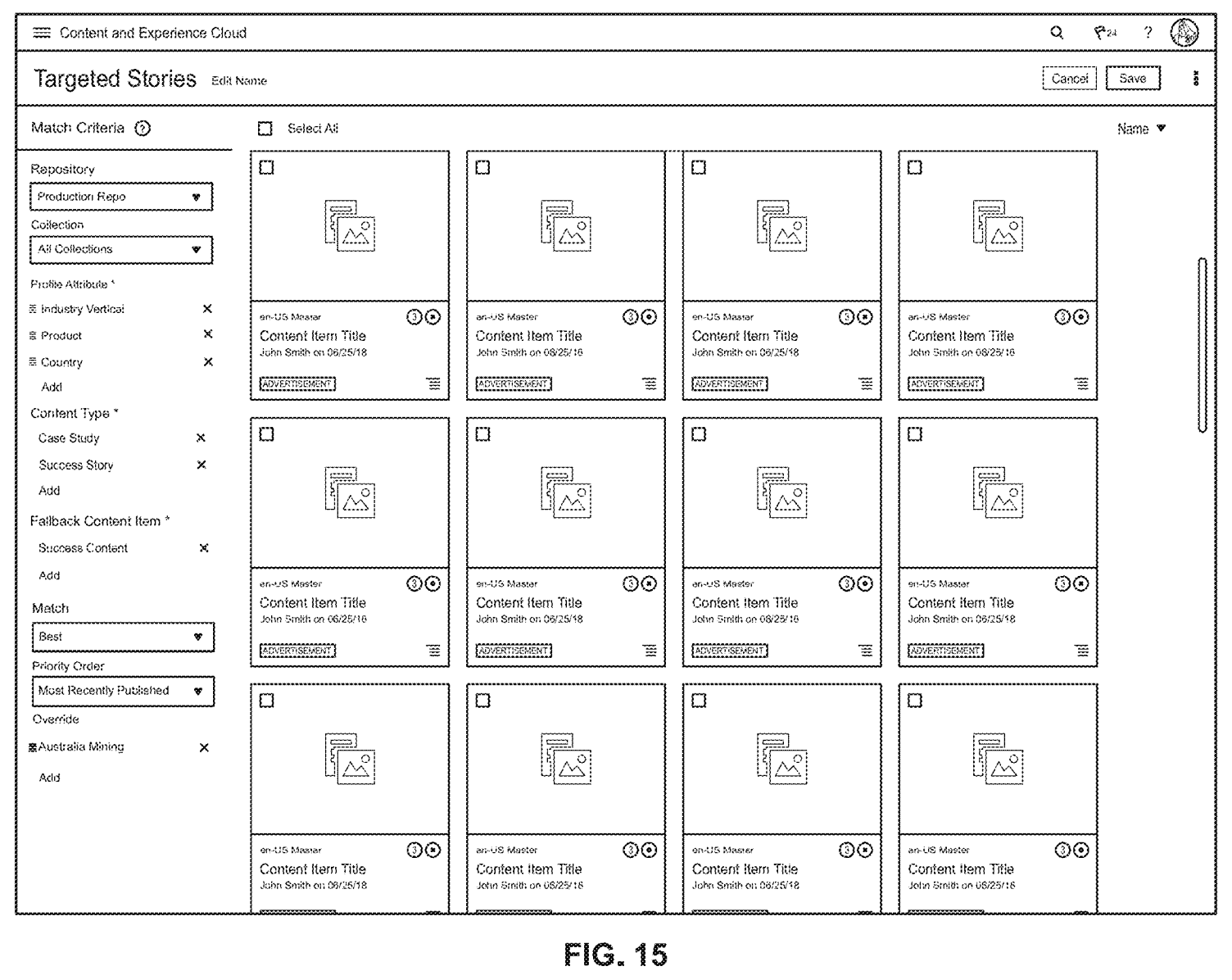

FIG. 15 illustrates another example of a graphical user interface, and usage thereof, for use with a system for delivery of content, in accordance with an embodiment.

Figure 16:
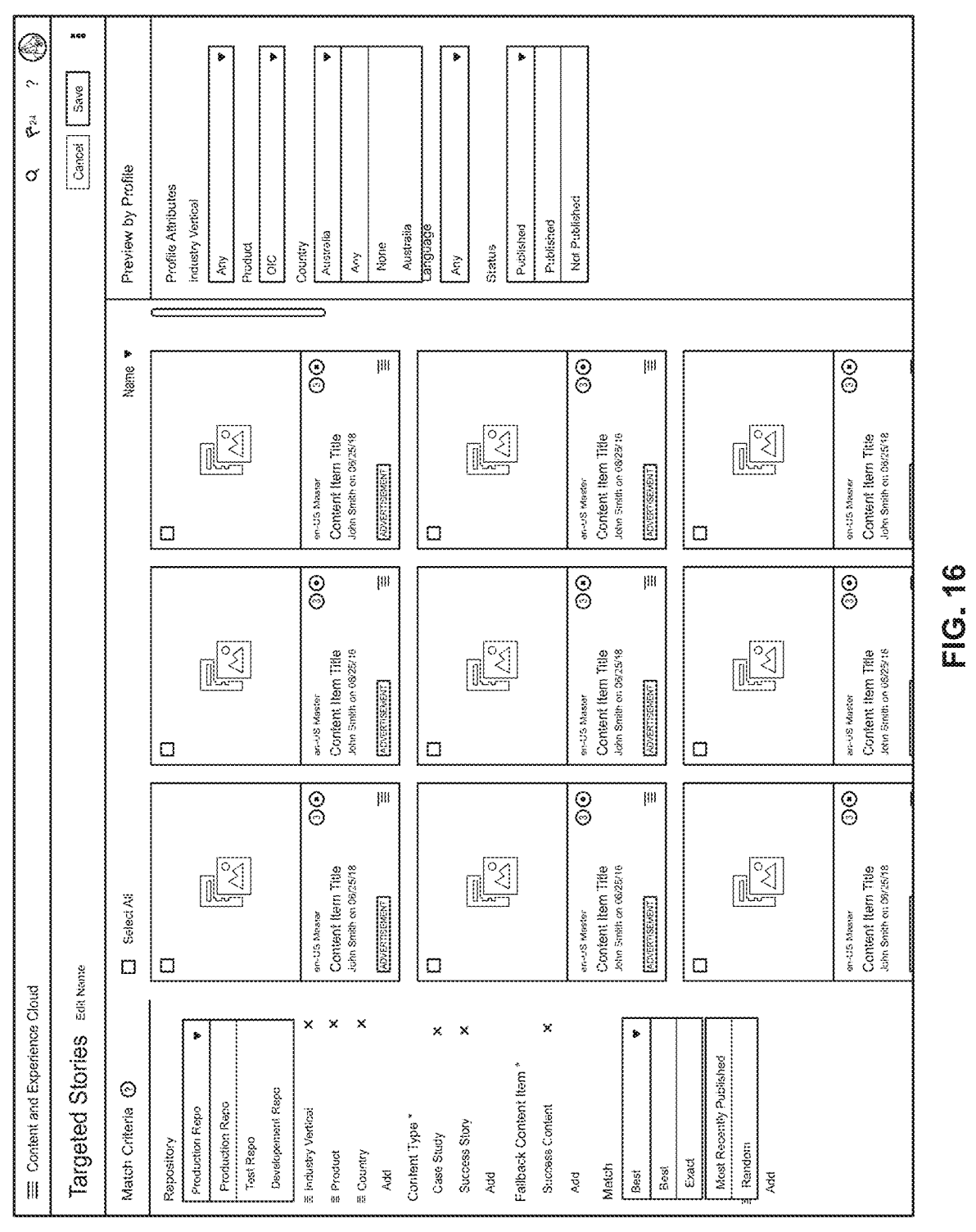

FIG. 16 illustrates another example of a graphical user interface, and usage thereof, for use with a system for delivery of content, in accordance with an embodiment.

Figure 17:
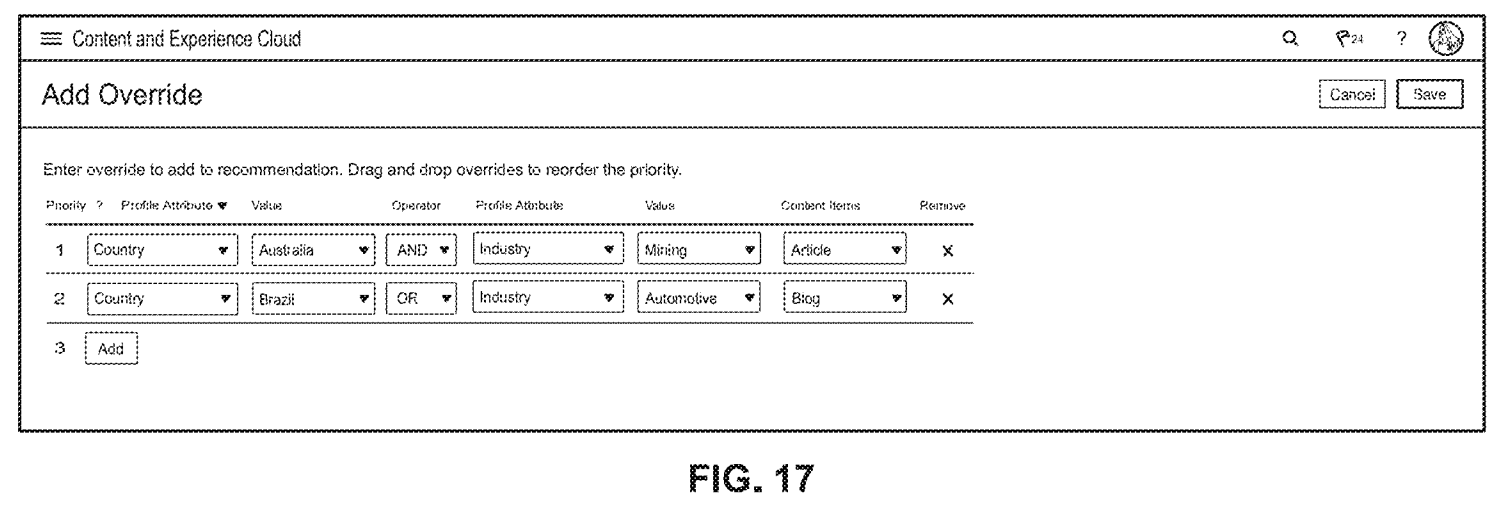

FIG. 17 illustrates another example of a graphical user interface, and usage thereof, for use with a system for delivery of content, in accordance with an embodiment.

FIG. 18 illustrates another example of a graphical user interface, and usage thereof, for use with a system for delivery of content, in accordance with an embodiment.

Figure 19:
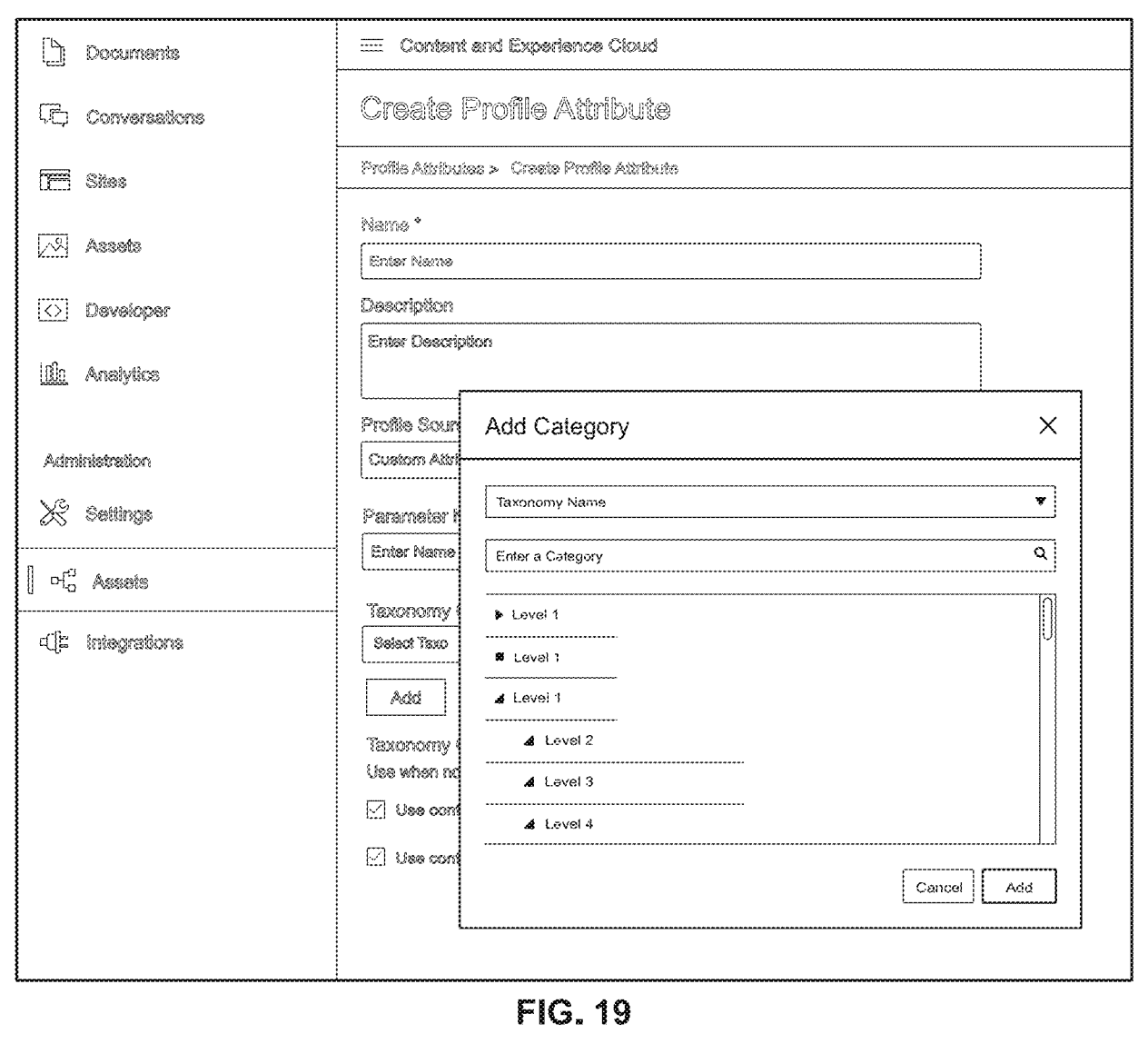

FIG. 19 illustrates another example of a graphical user interface, and usage thereof, for use with a system for delivery of content, in accordance with an embodiment.

Figure 20:
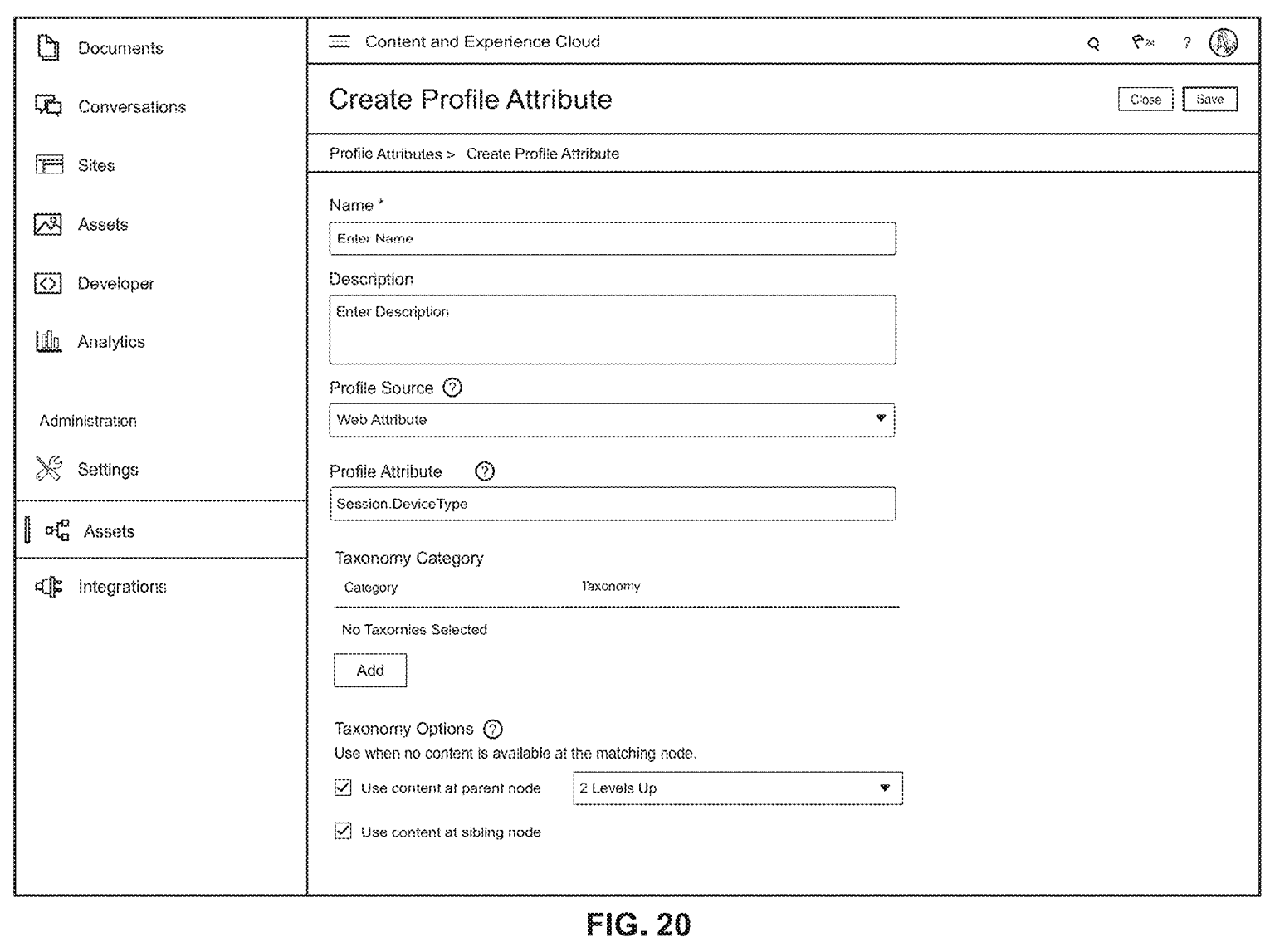

FIG. 20 illustrates another example of a graphical user interface, and usage thereof, for use with a system for delivery of content, in accordance with an embodiment.

FIG. 21 illustrates another example of a graphical user interface, and usage thereof, for use with a system for delivery of content, in accordance with an embodiment.

Figure 22:
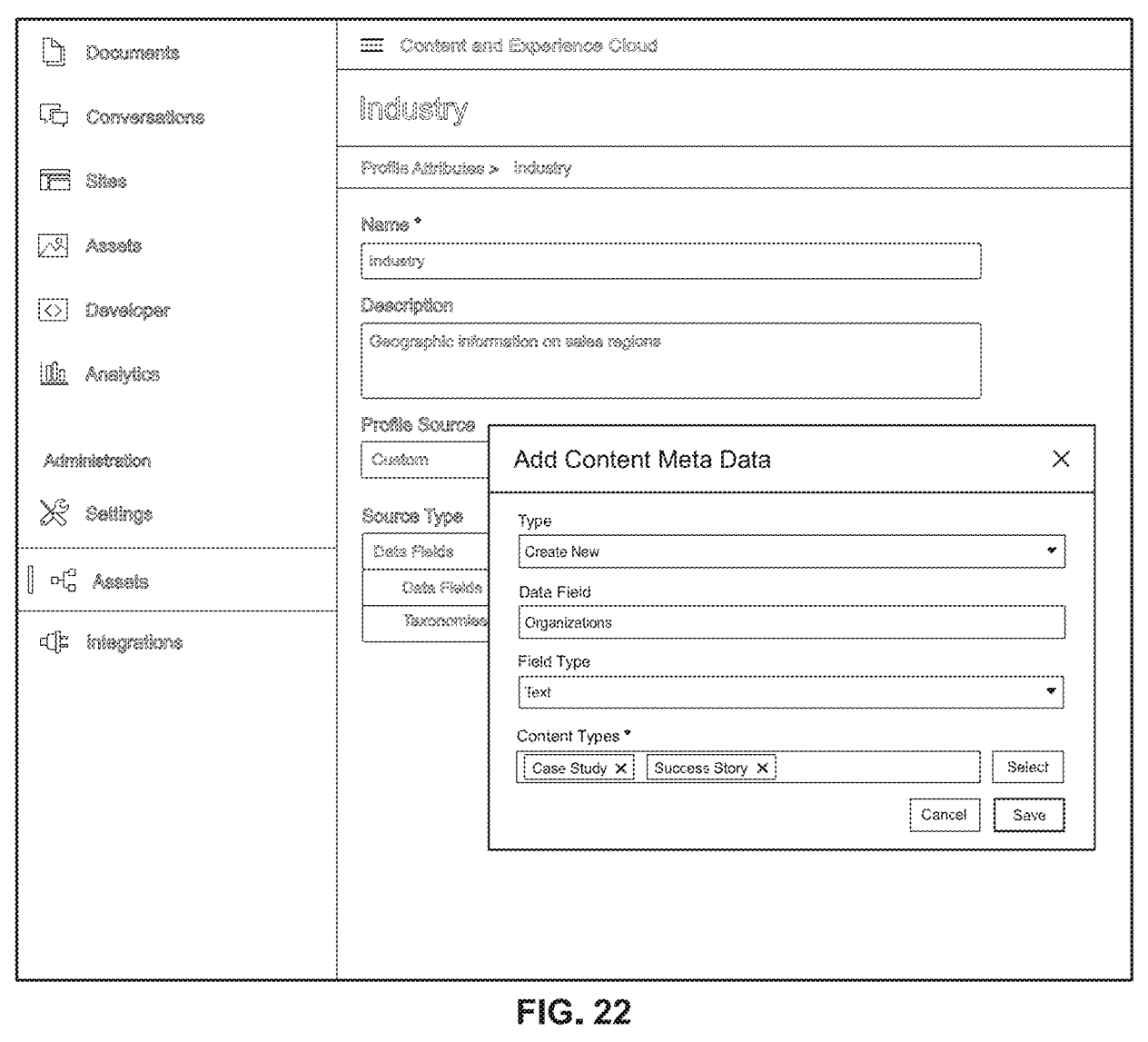

FIG. 22 illustrates another example of a graphical user interface, and usage thereof, for use with a system for delivery of content, in accordance with an embodiment.

DETAILED DESCRIPTION

Figure 1:
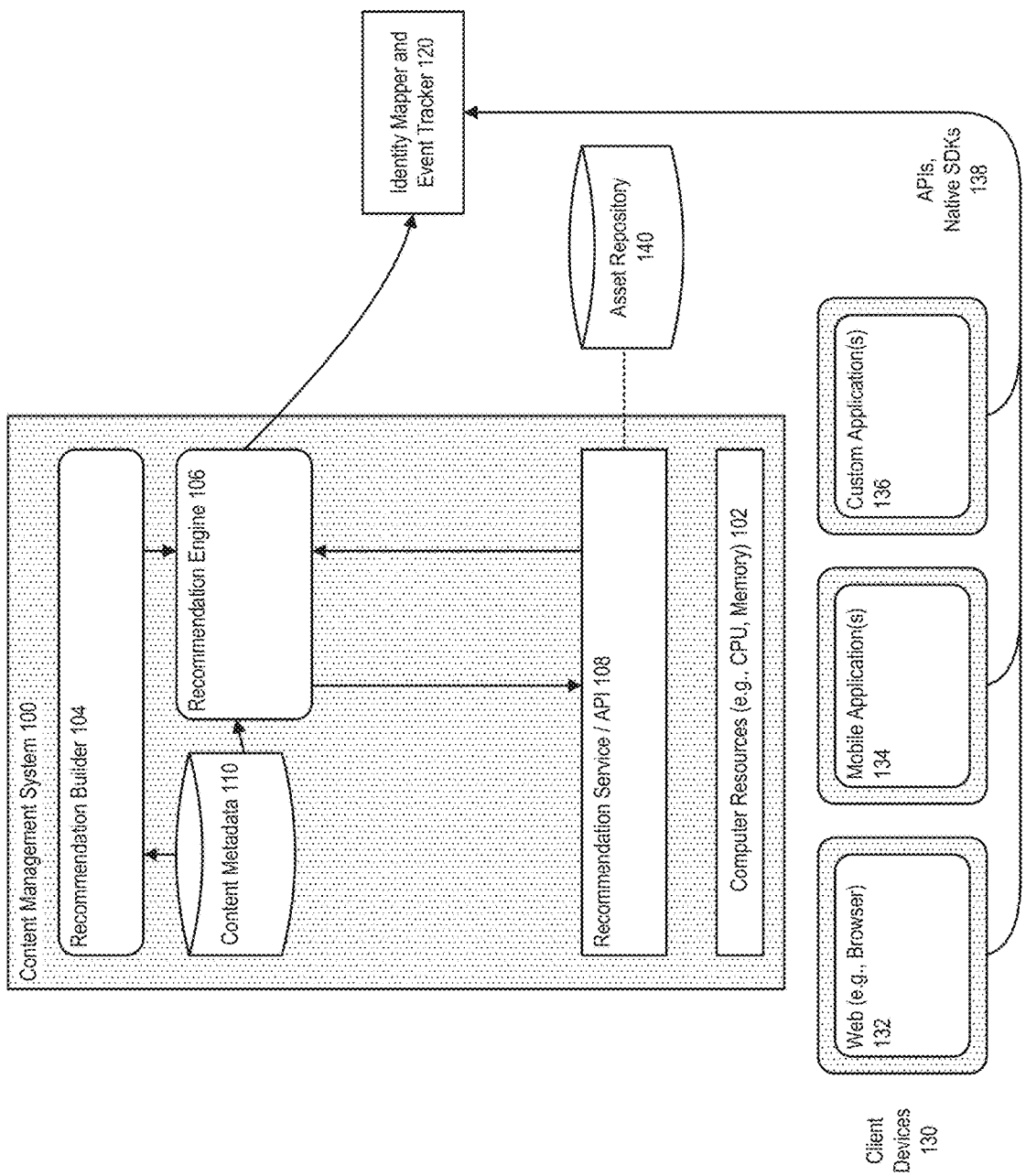
FIG. 1 illustrates a system for delivery of content, in accordance with an embodiment.

As described above, content targeting systems, as may be implemented in association with online, web, mobile, or other e-commerce or computer environments, operate in accordance with various approaches, for example, either by allowing a definition of target segments of users, and then targeting particular content to those segments using conditional segment targeting rules; or alternatively through the use of content targeting models that are largely driven by computer machine-learning; with each such approach having various associated advantages and disadvantages.

An additional consideration is that some content targeting systems may not have access to metadata describing the content, and instead must resort to associating the actual content with various target segments of users, each time a new piece of content is added to the system.

Furthermore, some content targeting systems operate primarily on the client-side, for example in a web browser environment, by replacing a browser's domain object model with targeted content. Such client-based approaches are generally less capable of supporting newer channels of content delivery, such as, for example, through the use of mobile applications, verbally-driven devices, or online conversational agents or chatbots.

In accordance with an embodiment, described herein is a system and method for delivery of content based on matching of user profiles with content metadata. The system enables delivery of personalized content, without the overhead of managing segment targeting rules, while providing content publishers or marketers with complete control over such personalization.

In accordance with an embodiment, a recommendation service or application program interface, provided by a computer, cloud computing environment, or other type of computer system, enables receipt and processing of requests, from client devices, for personalized content. A recommendation engine delivers content assets in response to a request from a client device. The recommendation engine determines a content channel and a user identity associated with the request, and then delivers content assets based on rules governing the matching of content asset metadata with the user profile. While content classification evolves over time, so also does the personalization of delivered content.

In accordance with an embodiment, a technical purpose or advantage of the systems and methods described herein is that a computer system so programmed can automatically determine delivery of an appropriate content (e.g., a best match) to end users, based, for example, on the user identity, profile data, the channels used for accessing content, and a past behavior; without needing to first create numerous user segments.

For example, in accordance with an embodiment, content publishers or marketers, who are interested in targeting appropriate content to users, can use the system to employ a configuration-driven targeting to achieve a best matching of content, even for a small sample set of users and content, including in some instances smaller sets with which a machine-learning model might otherwise fail to recommend appropriate content.

In accordance with an embodiment, the described systems and methods can be used to best match content for a particular user, based on the user's profile (user profile) and a content metadata associated with various content; while taking into account features such as content classification, tagging, or a semantic meaning of that particular content.

As described in accordance with various embodiments, additional features can include, for example:

(1) Content Matching: In accordance with an embodiment, the system can include a recommendation engine that automatically matches user profiles (e.g., Age=18, City="New York", Occupation=) against attributes assigned to content, instead of, for example, a content publisher or marketer being required to explicitly configure the content for target segments.

(2) Best Matching: In accordance with an embodiment, even if the available content does not exactly match all user profile attributes, the system can select and rank-order a best matching content (for example, content that matches a user's city and gender, but not their age) by priority, with the understanding that in the absence of an exact match, the best matching content is still better than non-personalized content, and is likely sufficient for most scenarios. By comparison, conventional content targeting systems generally attempt to deliver exact matches based on a combination of AND/OR conditions.

(3) Taxonomy: In accordance with an embodiment, the system can take into consideration a content classification taxonomy structure, and provide match recommendations based on a nearest content. For example, in accordance with an embodiment that matches content to visitors from various geographic locations, if there is a visitor from "Los Angeles", and there is no matching content for "Los Angeles", then the system can match proximal content classified, for example, as "California" or "San Diego", which is still better than non-personalized content.

(4) Artificial Intelligence (AI) and Natural Language Processing (NLP) based matching: In accordance with an embodiment, the system can use AI and NLP techniques to match content that is semantically near a user's profile. For example, in accordance with an embodiment, dog fanciers may be provided with a selection of images of puppies, even though a particular image may not be classified as a "dog".

In accordance with an embodiment, the approach to delivery of personalized content based on matching of user profiles with content metadata, as described herein, can take advantage of the system's knowledge of content, such as for example, its knowledge of topics, classification, tags, relationships, or semantic meaning associated with the content; over any manual determination of target segments (which requires much user input), or use of machine-learning models (which take a long time and results in loss of business user control).

In accordance with an embodiment, the described approach benefits from having direct access to a content management system; a knowledge of the system's fine-grained content classification and metadata; and tight coupling with the system's content store; which aspects have generally not been provided by conventional content targeting systems.

Additionally, in accordance with an embodiment, the approach to delivery of personalized content based on matching of user profiles with content metadata, as described herein, is server-based, such that it can be easily adapted to accommodate multiple different client types, and newer channels of content delivery.

In accordance with an embodiment, when compared with conventional approaches, that generally operate at different ends of a spectrum, for example, at one end a largely manual environment requiring the definition of potentially thousands of target segments; while at the other end a completely computer AI-controlled system—the described approach provides a middle ground that avoids the need to collect large amounts of training data, while still providing personalization and control over content delivery, across multiple channels.

System Architecture

FIG. 1 illustrates a system for delivery of personalized content, in accordance with an embodiment.

As illustrated in FIG. 1, in accordance with an embodiment, a content management system 100 can be provided at a computer environment, cloud computing environment, or other type of computer system that includes physical computer resources 102 (e.g., processor/CPU, memory), and is operable to provide access to a database or repository of stored content assets, referred to herein in some embodiments as an asset repository 140; and manage a content metadata 110 that is associated with the content assets.

In accordance with an embodiment, an example of an asset repository, and content assets, can be those provided by, for example, an Oracle Content and Experience (OCE) environment, or another type of asset repository or database; and an example of a content metadata can be that provided by OCE content metadata, or another type of content metadata.

The above examples of asset repository or database, content assets, or content metadata are provided in accordance with an embodiment, and for purposes of illustration. In accordance with various embodiments, the system can operate with other types of asset repository or database, content assets, or content metadata.

Depending on the particular embodiment, the asset repository can include or store the actual content metadata describing the content assets that are stored therein. Alternatively, the content metadata can be stored elsewhere within the system.

Additionally, depending on the particular embodiment, the content itself can be stored within (e.g., owned by) the content management system; or, alternatively, the content can be stored outside of the content management system, for example as a proxy content, and accessed, for example, by pointers to that content.

In accordance with an embodiment, the system can further include a recommendation builder 104, and a recommendation engine 106, each of which can be provided as software or program code executable by a computer system or other processing device. The recommendation builder and recommendation engine operate according to a plurality of recommendation rules that together configure the system to compare user profile attributes with the content metadata associated with the content assets; and, for example, determine a ranked collection of one or more content assets to return, in response to a request for personalized content, that, for example, exactly match a user profile, or best match the user profile.

In accordance with an embodiment, for each user of a plurality of users, a user identity is determined in association with one or more sessions on one or more content channels, for example using an identity mapper and event tracker 120.

In accordance with an embodiment, an example of an identity mapper and event tracker can be that provided by, for example, an Oracle CX Unity environment, an Oracle Infinity environment, or another type of identity mapper or event tracking system.

For example, in accordance with an embodiment, a CX Unity environment is adapted to bring together various online, offline, and third-party customer data sources to create a single, dynamic view of a customer; while an Infinity environment provides a digital analytics platform for tracking, measuring, and optimizing the performance and visitor behavior of enterprise websites and mobile applications, including an analytics application that provides a set of report collections for exploring and managing data.

The above examples of identity mappers and event trackers are provided in accordance with an embodiment, and for purposes of illustration. In accordance with various embodiments, the system can operate with other types of identity mappers and event trackers.

In accordance with an embodiment, as further described below, a data describing user profiles, and user profile attributes, associated with the plurality of users, can also be received from one or more additional profile sources.

In accordance with an embodiment, a recommendation service or application program interface (API) 108 enables receipt and processing by the recommendation engine of requests, from client devices 130, for personalized content, whereupon the recommendation engine specifies delivery of content assets, including, in response to a particular request from a client device, determining a content channel and a particular user identity associated with the particular request, and then determining content assets based on rules governing the matching of content asset metadata with the user's profile.

In accordance with an embodiment, each different type of client device, such as, for example, web (e.g., browser) 132, mobile application(s) 34, and custom applications(s) 136, can be associated with different APIs or native software development kits (SDKs) 138 that are appropriate to those types of devices.

Generally described, in accordance with an embodiment, the recommendation service or API exercises the logic of the recommendation engine, and can be accessed by clients at various endpoints, to issue requests for content; while the recommendation builder builds the recommendations, for use by the recommendation engine, which are then exposed by the recommendation service or API.

The above examples of different types of client devices are provided in accordance with an embodiment, and for purposes of illustration. In accordance with various embodiments, the system can operate with other types of clients or client devices.

Figure 2:
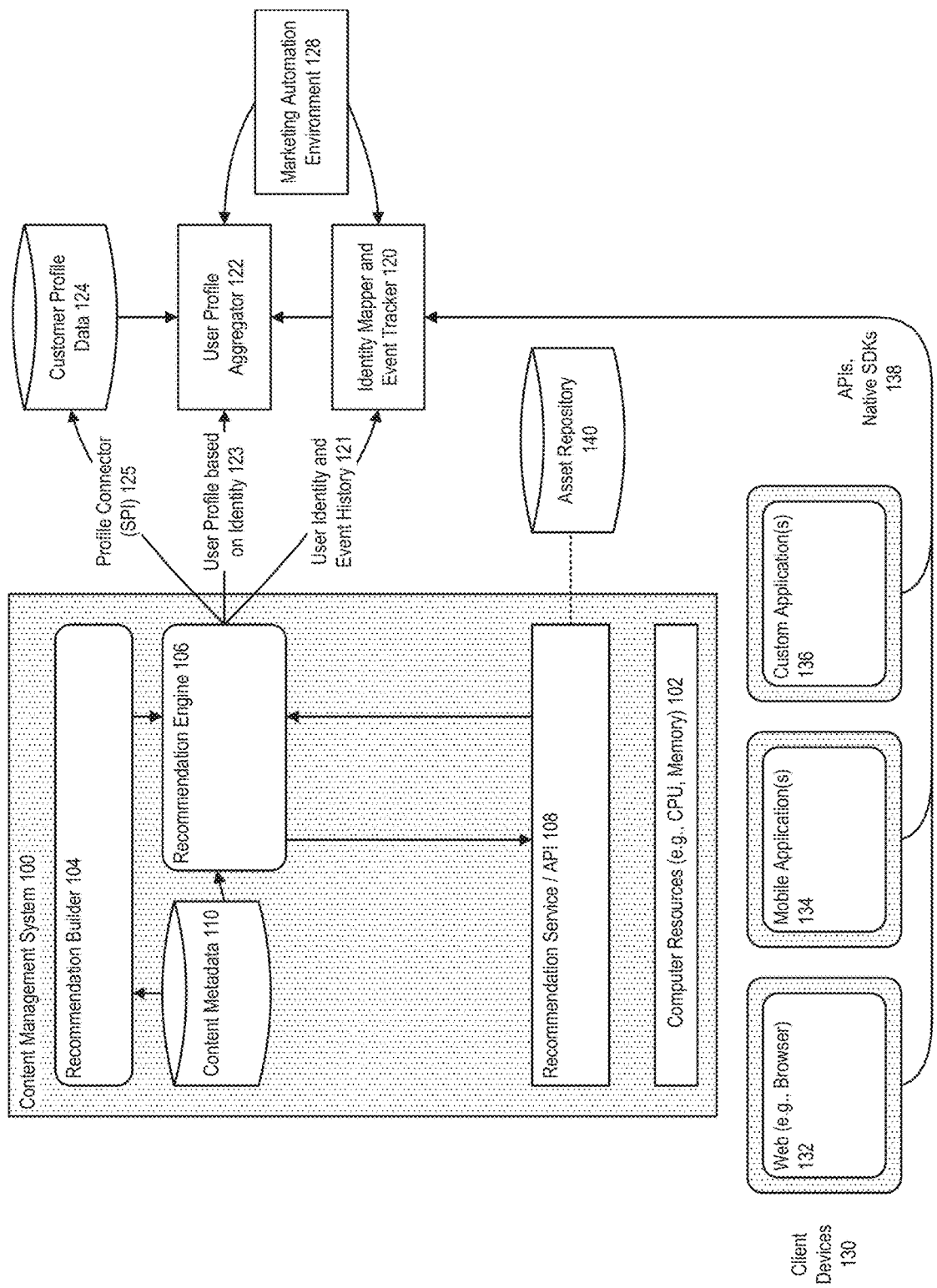
FIG. 2 further illustrates a system for delivery of content, in accordance with an embodiment.

FIG. 2 further illustrates a system for delivery of personalized content, in accordance with an embodiment.

As described above, in accordance with an embodiment, a data describing user profiles and user profile attributes associated with the plurality of users can be received from one or more additional profile sources.

In accordance with an embodiment, such profile information can generally be received by a variety of methods, including: long term user profile information, and real-time tracking information.

In accordance with an embodiment, long term user profile information can be received via a connector, for example, from a CX Unity environment, or another type of user profile aggregator.

In accordance with an embodiment, real-time tracking information, for example information describing a user's browsing history, can be received as event information, which provides micro-event tracking, such as, for example the time spent by a user on a particular web page, clicks, or hovering.

As illustrated in FIG. 2, in accordance with an embodiment, additional user profile information can be received from a user/customer profile database 124, for example via a profile connector or service provide interface (SPI) 125; and/or via a user profile aggregator 122 which provides a user profile based on identity 123.

In accordance with an embodiment, the above components can also interoperate with a marketing automation environment 128 (e.g., Oracle Eloqua) that enables access by a content publisher or marketer to develop marketing processes across multiple channels, create customer profiles or to strategically filter and segment audiences to create granular segments based on attributes, for example behavior, or geography.

In accordance with an embodiment, an example of a user profile aggregator can be provided by a CX Unity environment, or another type of user profile aggregator; while an example of a marketing automation environment can be provided by an Oracle Marketing Cloud (OMC) environment, an Eloqua environment, or by another type of marketing automation environment.

The above examples of user profile aggregator and marketing automation environment are provided in accordance with an embodiment, and for purposes of illustration. In accordance with various embodiments, the system can operate with other types of user profile aggregators and marketing automation environments.

In accordance with an embodiment, the received information can be packaged as attributes of the user profile; against which the recommendation engine can apply recommendation rules (for example, based on taxonomy, tags, or semantic aspects) to determine a recommendation. The determined recommendation can then be used by a delivery service, client, or other mechanism, to fetch the associated content from the asset repository.

Figure 3:
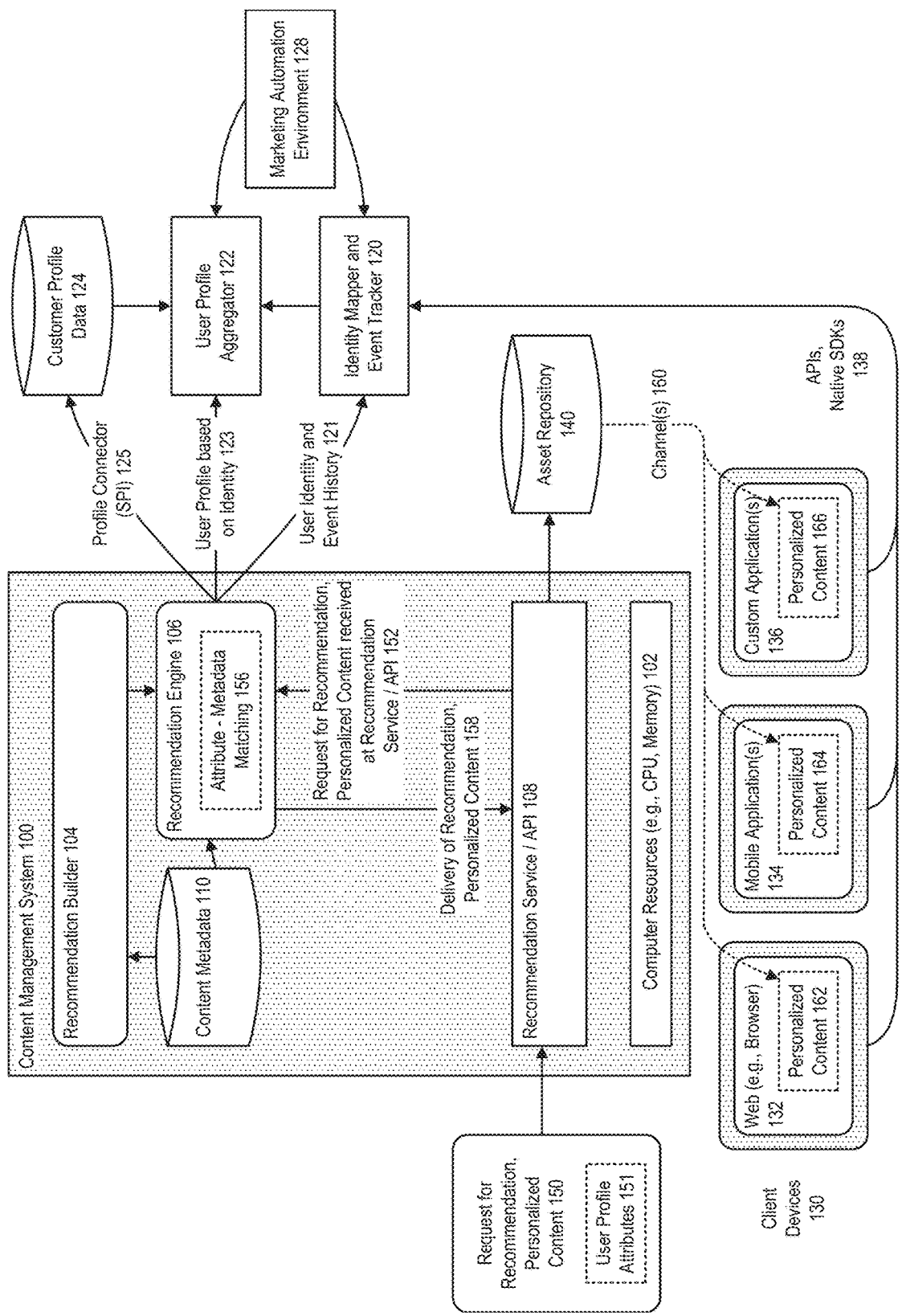
FIG. 3 further illustrates a system for delivery of content, in accordance with an embodiment.

FIG. 3 further illustrates a system for delivery of personalized content, in accordance with an embodiment.

As illustrated in FIG. 3, in accordance with an embodiment, a request 150 for recommendation or personalized content is received at the recommendation service/API, and is associated with a set of user profile attributes 151.

In accordance with an embodiment, the request is passed 152 to the recommendation engine, which performs an attribute-metadata matching 156, for use in determination and delivery 158 of a recommendation or personalized content.

In accordance with an embodiment, depending on the particular channel(s) 160 used for, or associated with, the request, an appropriate personalized content 162, 164, 166, is delivered to the client devices.

Figure 4:
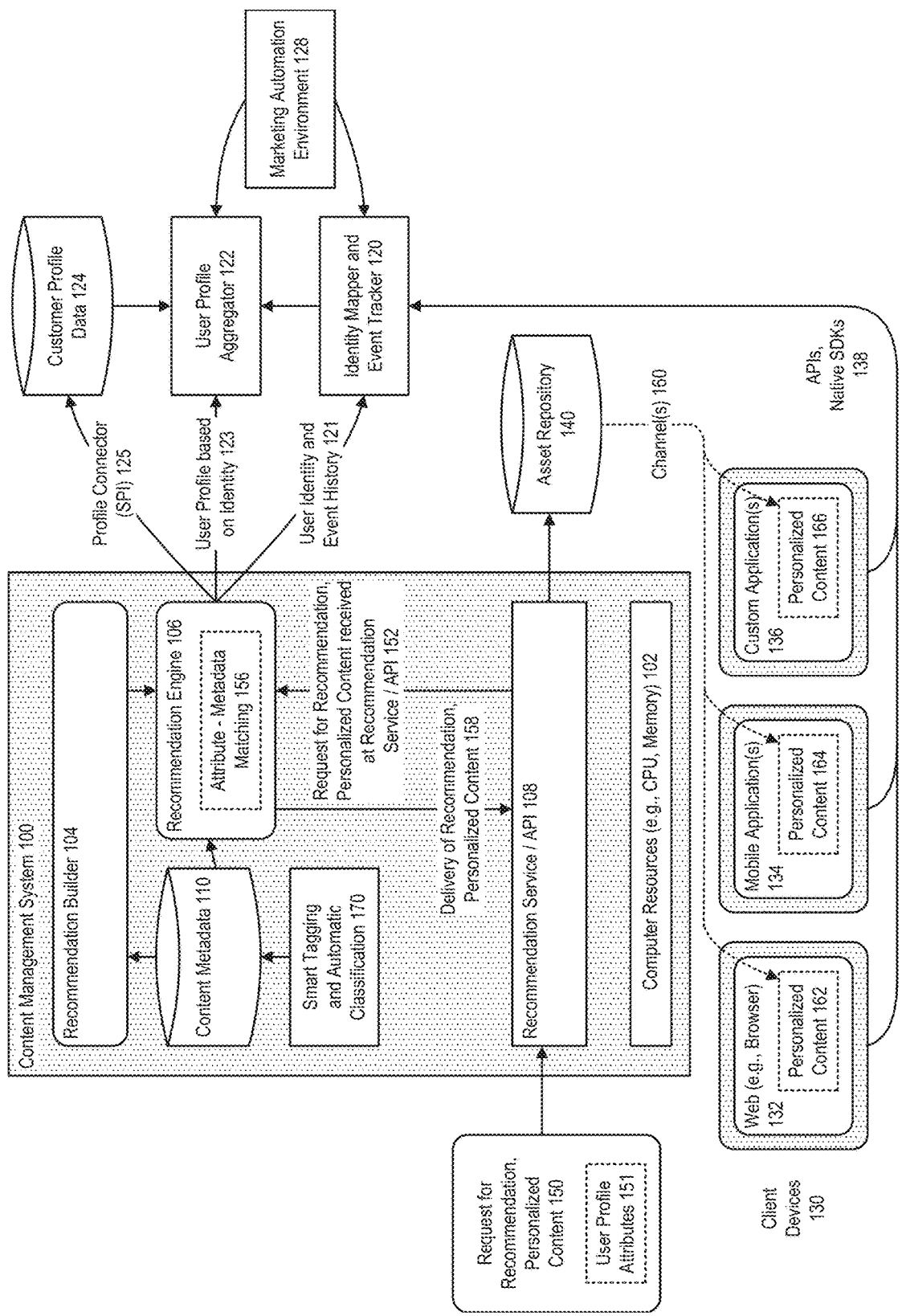
FIG. 4 further illustrates a system for delivery of content, in accordance with an embodiment.

FIG. 4 further illustrates a system for delivery of personalized content, in accordance with an embodiment. For example, as illustrated in FIG. 4, in accordance with various embodiments, additional functionality can be employed within the system, for example the use of smart tagging and/or automatic classification 170.

Example Implementation

In accordance with various embodiments, the system can employ some or all of the features described below, to address various use cases. Specific details are set forth in order to provide an understanding of the various embodiments. However, it will be apparent that various embodiments may be practiced without these specific details. The enclosed specification and drawings are not intended to be restrictive.

Best Match with Relevancy Ranking

In accordance with an embodiment, matches between user profile attributes and content metadata can be established by natural language processing functions, including, for example, one or more of: a semantic match, or synonym match, of attribute to content metadata; a fuzzy match, or stemmed match, of attribute to content metadata; and/or a named entity match. The system can also be configured to return matches with a relevancy ranking.

Personalization System and Search Engine Optimization

In accordance with an embodiment, the system can support search engine optimization (SEO) of, for example, a website or other online environment, by treating a search engine crawler as one or more distinct user profiles, and serving distinct personalized content, which enables the search engine crawler to find distinct content, for use in determining a search engine optimization score for the site.

Personalization Across Multiple Channels

In accordance with an embodiment, the system can be adapted to provide personalization across multiple different channels, through the use of an API architecture as described above, including the ability to track a user journey across these different channels, via a common user profile database.

Graphical User Interface and Configuration

In accordance with an embodiment, the system can include a graphical user interface that provides a view of each user/customer's profile attributes that are mapped, for example, to OCE content metadata or taxonomy, or another type of content metadata or taxonomy, for personalization.

In accordance with an embodiment, a profile attribute defines a visitor profile attribute that is used for personalization. Some examples of sources for these profile and other attributes can include:

(1) Profile attributes: For example, CX profile attributes retrieved from a CX Unity environment or other environments, for example, Responsys→Gender; Eloqua-→First Name.

(2) Web Session attributes: For example, attributes extracted from an HTTP request, for example, IP address→geolocation, device type (e.g., laptop, phone, tablet), URL parameters.

(3) Session History attributes: For example, attributes derived from session history (which requires collection and aggregation of session data), for example, a new visitor versus a repeat visitor, or that a particular customer "liked" a content item during their last visit.

(4) Complex Attribute: For example, an attribute that is not natively available in the profile views exposed to the recommendation engine, but constructed from a data transform query, for example, on CX Unity data. Generally, this requires a query to create such an attribute, for example: (1) most recent product purchased within the last three months; (2) repeat visitor on, for example, an OCE site within the last three months.

(5) Third-party Profile Attributes: For example, attributes collected from third-party tools, such as BlueKai.

In accordance with an embodiment, identity mapping establishes the identity of anonymous visitors on, for example, OCE sites or channels, who also visited other CX channels (for example, a Responsys landing page, or Oracle Commerce Cloud) as registered users in the past. This can be mapped via a common tag (e.g., an Infinity tag) that can subsequently be used to retrieve their, e.g., CX profile, and deliver personalized content to such anonymous visitors in an OCE environment.

In accordance with an embodiment, the user profile aggregator aggregates user profile data from multiple sources, for example, an Infinity environment; and provides a common API to query user profile attributes.

In accordance with an embodiment, identity mapping and event tracking can be used to tracks a user's anonymous identity across sessions; stitch identity across various touchpoints (e.g., email, web); and join the identity once the user logs in.

Example Delivery-Time Environment

In accordance with an embodiment, the received information from various sources or environments can be packaged as facts; against which the recommendation engine can apply recommendation rules (for example, based on taxonomy, tags, or semantic aspects) to determine a recommendation. The determined recommendation can then be used by a delivery service, client, or other mechanism to fetch the associated content from the asset repository.

Figure 5:
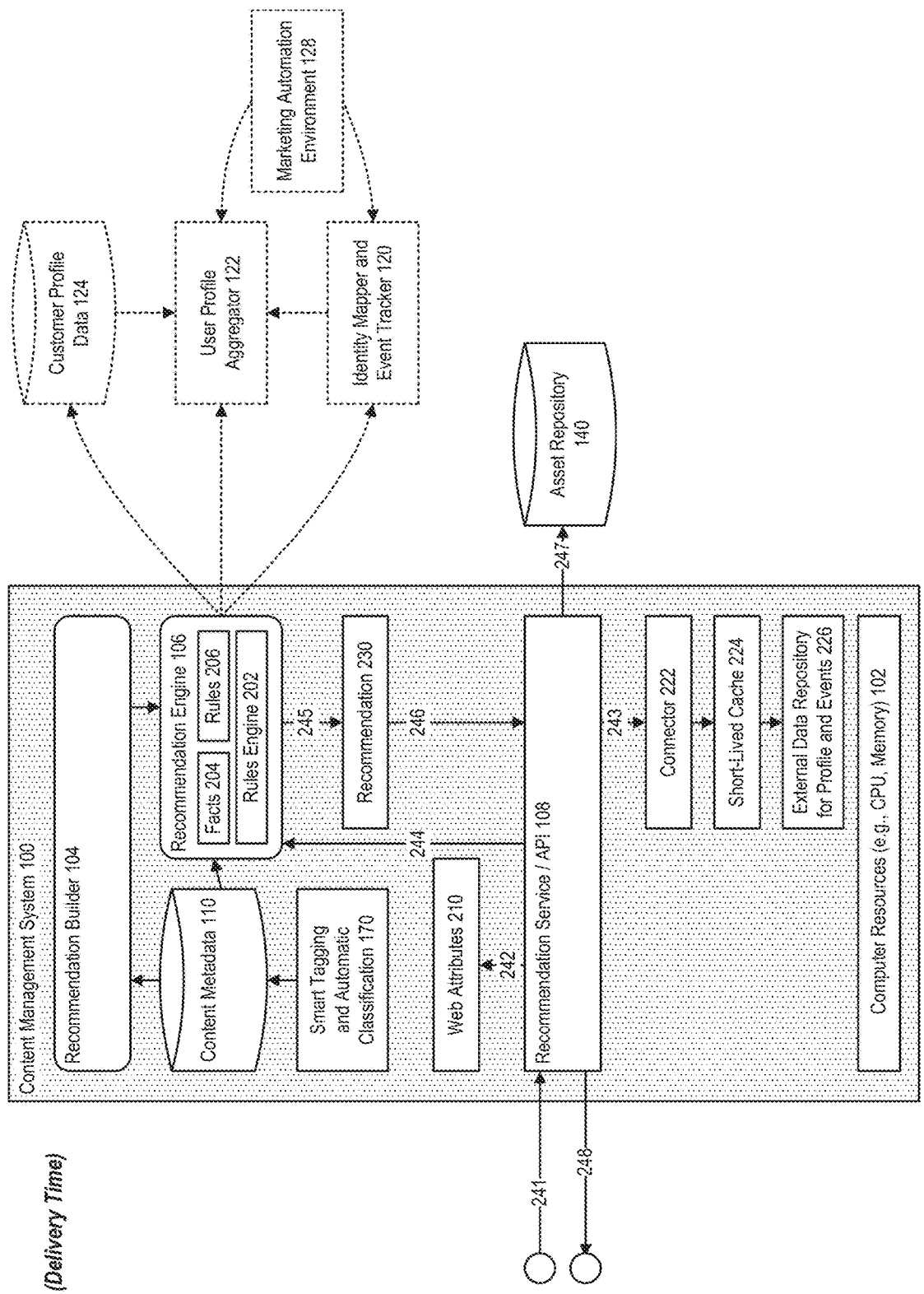
FIG. 5 further illustrates a system for delivery of content, in accordance with an embodiment.

FIG. 5 further illustrates a system for delivery of personalized content, in accordance with an embodiment.

As illustrated in FIG. 5, in accordance with an embodiment, the recommendation engine can be programmed to operate a rules engine 202, including facts 204, and recommendation rules 206.

For example, in accordance with an embodiment, a request can be associated with web attributes 210. The recommendation service or API can be associated with a connector 222, and short-lived cache 224, that provides access to an external data repository for user profile and events 226.

In accordance with an embodiment, at delivery-time, in response to receipt of a request 241, web attributes are determined 242, processed by the connector 242, and passed 244 to the recommendation engine; for use in determining 245 a set of content assets that should be recommended, and passing 246 content asset identifiers to the recommendation service or API.

In accordance with an embodiment, the content asset identifiers are then are used to fetch one or more content assets 247 from the asset repository 140, which is/are then returned 248 to a client device.

Example Design-Time Environment

In accordance with an embodiment, the system can also be used to enable setup or configuration of the recommendation engine, for example to preview what a particular user might see while interacting with the system. In accordance with an embodiment, the same delivery-time environment as described above can be used, wherein the user is the recommendation builder itself.

Figure 6:
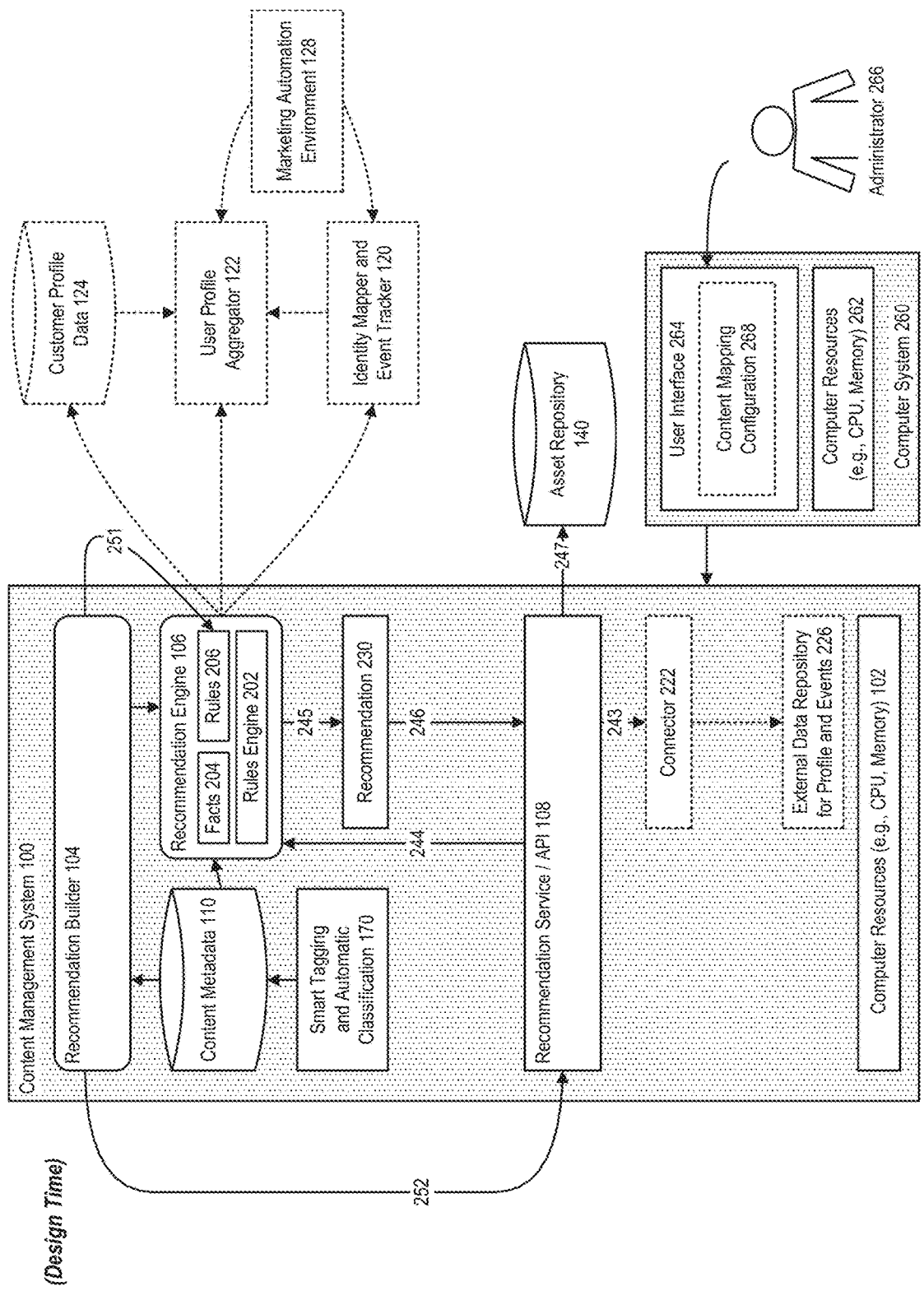
FIG. 6 further illustrates a system for delivery of content, in accordance with an embodiment.

FIG. 6 further illustrates a system for delivery of personalized content, in accordance with an embodiment.

As illustrated in FIG. 6, in accordance with an embodiment, the recommendation builder can be used to create recommendation rules 251, and issue requests 252 to the recommendation service or API, for use in designing rules and sites. The remainder of the process during design-time is the same as during delivery-time, as described above. The above allows an administrator to, for example, build a new website and then view the content on that site as a particular type of user.

For example, in accordance with an embodiment, a computer system 260 that includes computer resources 262 (e.g., processor/CPU, memory), and a graphical user interface 264, can be provided to enable an administrator 266 to review and modify content mapping configurations 268, for use by the system, including the recommendation builder and recommendation engine as described above.

Example Method for Delivery of Personalized Content

Figure 7:
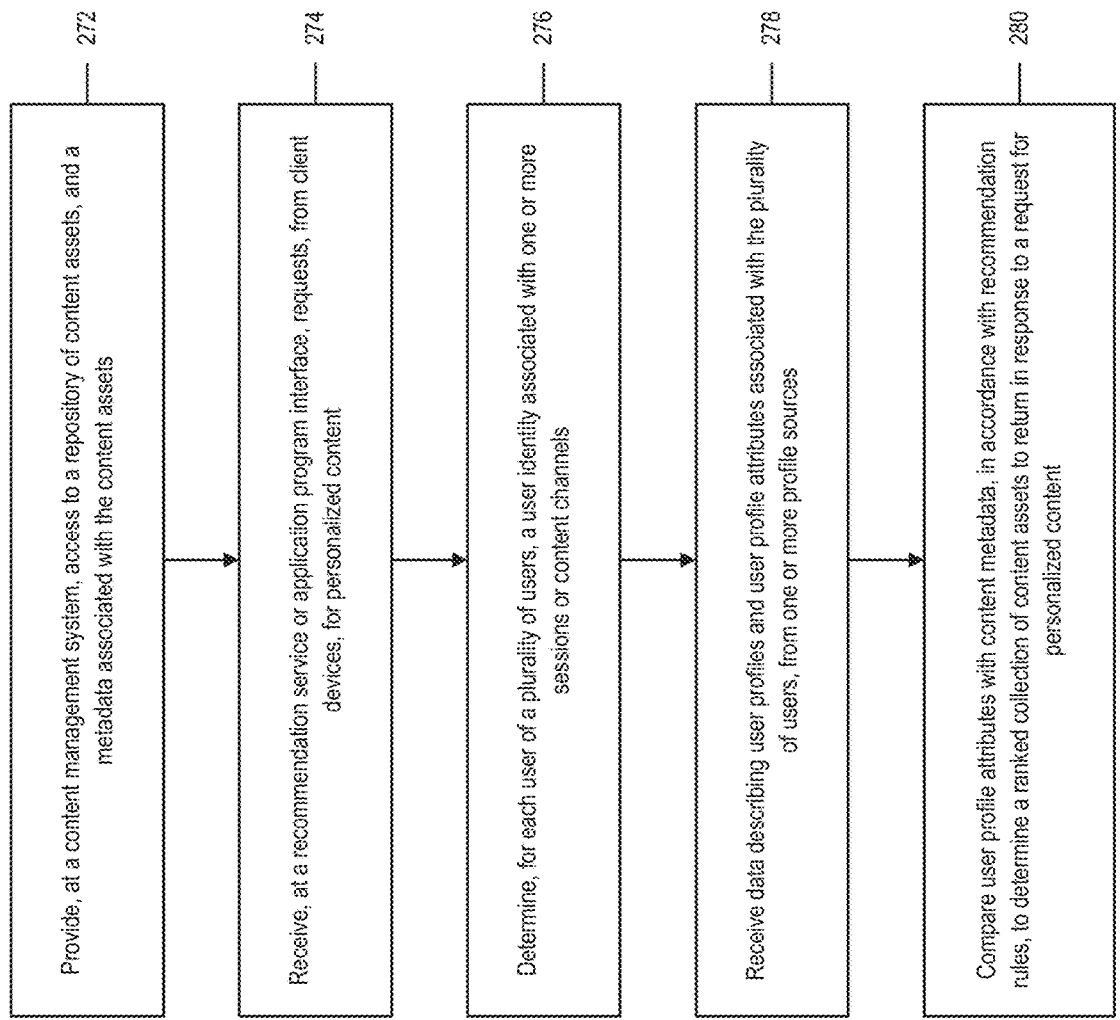
FIG. 7 illustrates a method for delivery of content, in accordance with an embodiment.

FIG. 7 illustrates a method for delivery of personalized content, in accordance with an embodiment.

As illustrated in FIG. 7, in accordance with an embodiment, the method comprises, at step 272, providing, in a content management system, access to a repository of content assets, and metadata associated with the content assets.

In accordance with an embodiment, the method further comprises, at step 274, receiving, at a recommendation service or application program interface, requests, from one or more client devices, for personalized content.

In accordance with an embodiment, the method further comprises, at step 276, determining, for each user of a plurality of users, a user identity associated with one or more sessions or content channels.

In accordance with an embodiment, the method further comprises, at step 278, receiving data describing user profiles and user profile attributes associated with the plurality of users, from one or more profile sources.

In accordance with an embodiment, the method further comprises, at step 280, comparing user profile attributes with content metadata, in accordance with recommendation rules, to determine a ranked collection of content assets to return in response to a request for personalized content.

Recommendation Rules as a Continuum

Although the embodiments described above generally illustrate means for providing a recommendation based, for example, on an evaluation of user profile attributes and content attributes, and then determining a best matching content; an alternative approach is to consider recommendation rules provided within a continuum.

For example, a content publisher or marketer may not want to relinquish control of determining specific content completely to machine-learning; but may instead be interested in some amount of machine enhancement to a particular set of defined rules.

Figure 8:
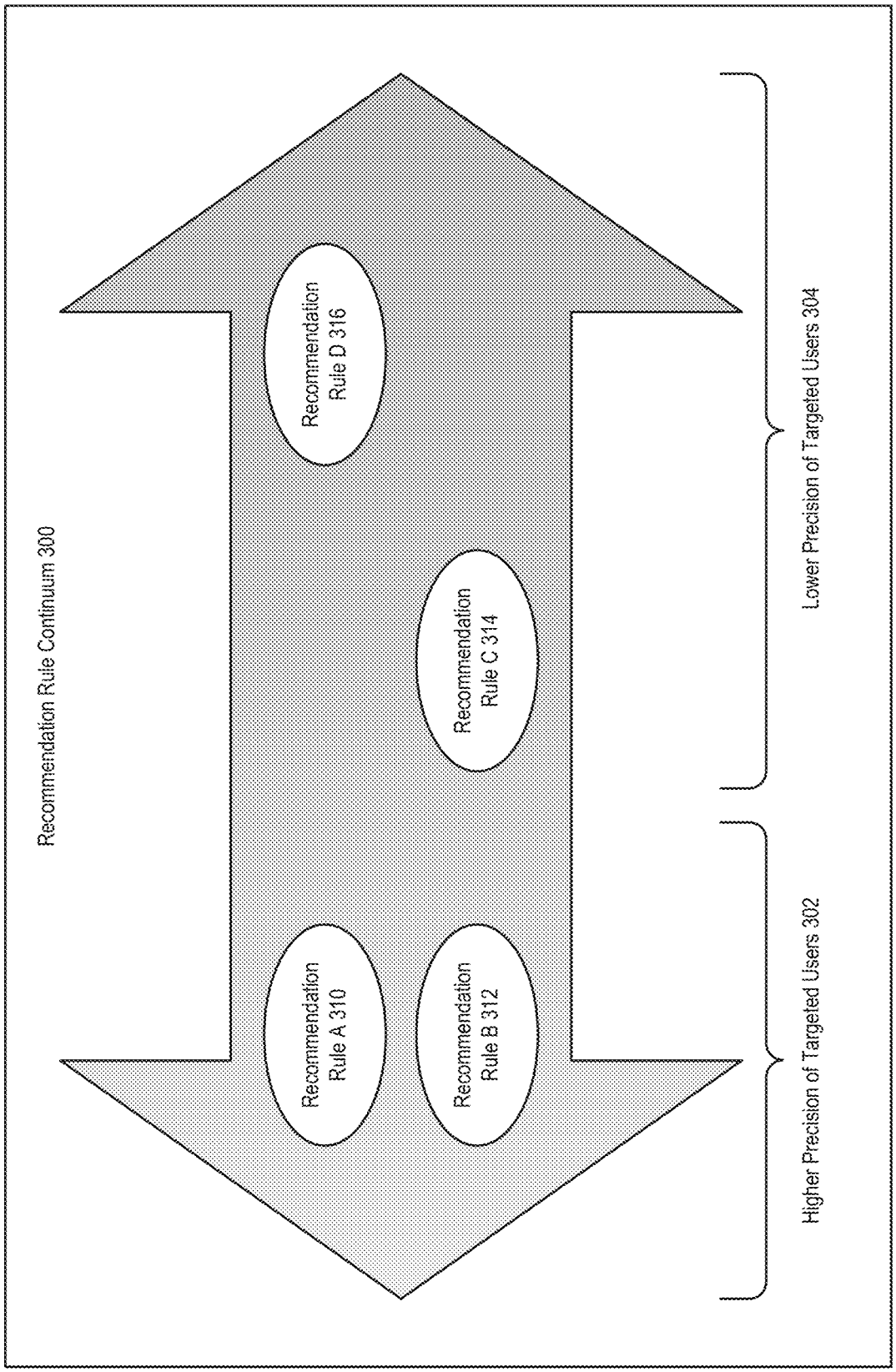
FIG. 8 illustrates an example of recommendation rules as a continuum, in accordance with an embodiment.
Figure 9:
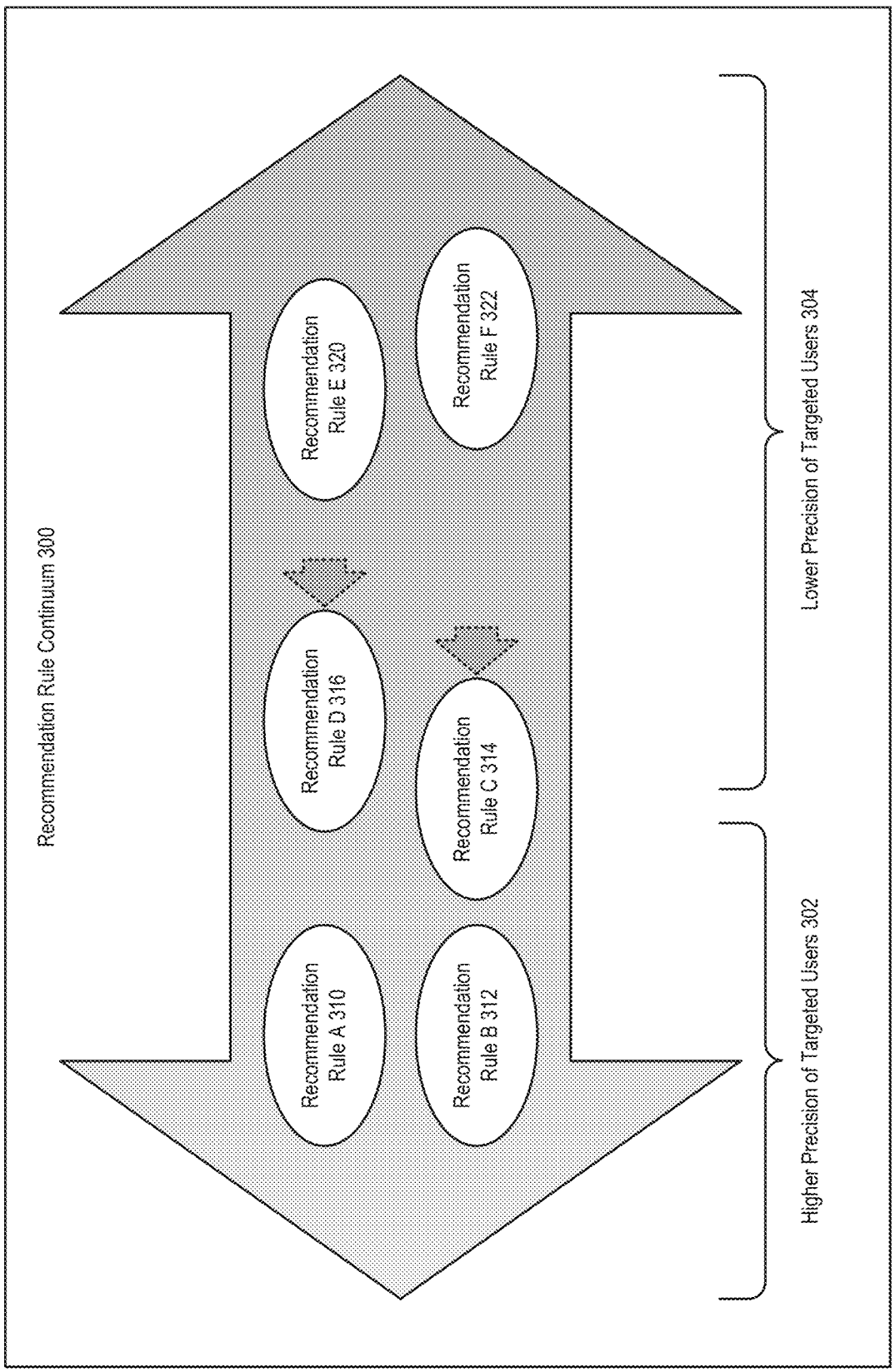
FIG. 9 further illustrates an example of recommendation rules as a continuum, in accordance with an embodiment.

FIGS. 8 and 9 illustrate an example of recommendation rules as a continuum, in accordance with an embodiment.

For example, as illustrated in FIG. 8, in accordance with an embodiment, a plurality of recommendation rules can be provided within a recommendation rule continuum 300 that varies, for example, from a higher precision of targeted users 302, to a lower precision of targeted users 304, including, in this example, recommendation rules A 310, B 312, C 314, and D 316; wherein each rule is associated with a particular degree of precision.

In accordance with an embodiment, those recommendation rules that are associated with a higher degree of precision (e.g., rules A and B), for example with regard to targeted users and/or content, allow greater publisher or marketer control, and rely less on machine control. Other recommendation rules that are associated with a lower degree of precision (e.g., rule C), rely more on machine control. Yet other recommendation rules that are associated with an even lower degree of precision (e.g., rule D), rely even more on machine control, and are well suited to the use of machine control of best matching, as described above.

For example, in accordance with an embodiment, a content publisher or marketer might configure a recommendation rule that operates so that visitors to a content site from "New York" (rule A) receive a New York area article; while visitors from "San Francisco" (rule B) receive a San Francisco area article; while visitors from "Chicago" or from "Houston" (rule C) receive instead a content that is based, say, on their industry vertical; while all other users (rule D), generally located within the tail of the continuum, receive instead a best matching content that is based, say, on their personal interests, In accordance with an embodiment, recommendation rules that are associated with a highest precision, say of targeted users (e.g., rules A, B) are considered exact target criteria, since both the user and content selection are well known. Rules associated with an intermediate precision (e.g., rule C) may be equally precise with regard to users, but less precise with regard to content, and can utilize some aspects of best match. Rules associated with a lower precision (e.g., rule D) can be handled as a best effort by the content targeting system.

In accordance with an embodiment, the higher the precision associated with a particular recommendation rule, the more the content publisher or marketer can control the specific targeting associated with that rule—such as for example, the targeting of specific content to certain users; although such rules generally require more setup time.

In accordance with an embodiment, the system can also evaluate, over a period of time, information as to the best matches provided for particular recommendation rules, and surface that information to the content publisher or marketer for use in creating newer (e.g., higher-precision) rules, or providing other feedback for other use by the system.

For example, as illustrated in FIG. 9, in accordance with an embodiment, a recommendation rule can be run and modified by the system for a period of time, so that segments that are (originally) located within the tail of the continuum (e.g., Rules C, D) can be moved along the continuum, toward a more precise targeting of content for those users.

Additionally, in accordance with an embodiment, the use of a rule continuum enables the content publisher or marketer to perform, for example, A/B testing, or other types of analysis, to determine which recommendations are likely to converge sooner within a period of time; or to determine new target segments or recommendation rules (e.g., rules E 320, F 322); or tune or otherwise adjust recommendations that are appropriate for the various target segments.

Example Graphical User Interface

Figure 10:
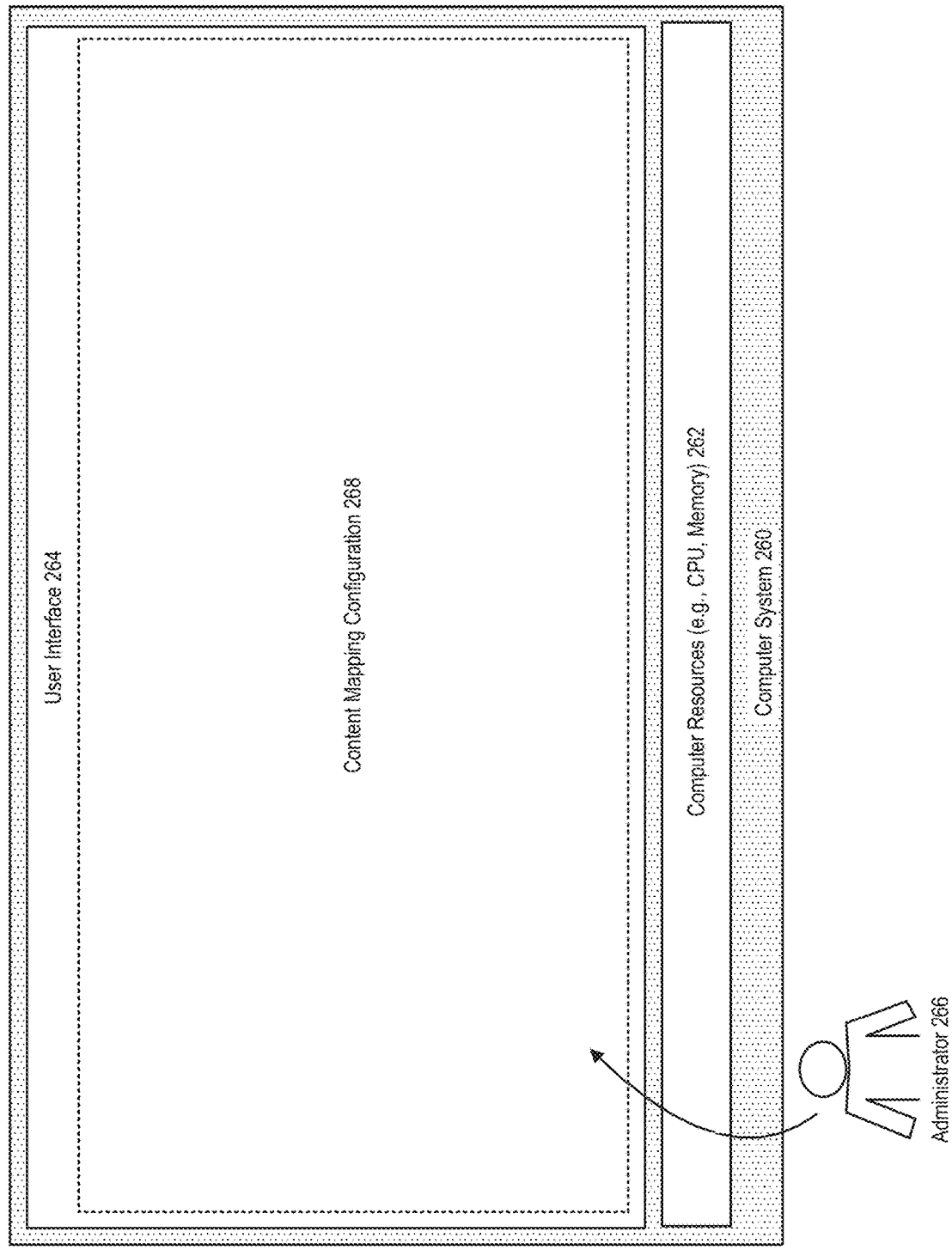
FIG. 10 illustrates the use of a graphical user interface to configure or interact with a system for delivery of content, in accordance with an embodiment.
Figure 11:
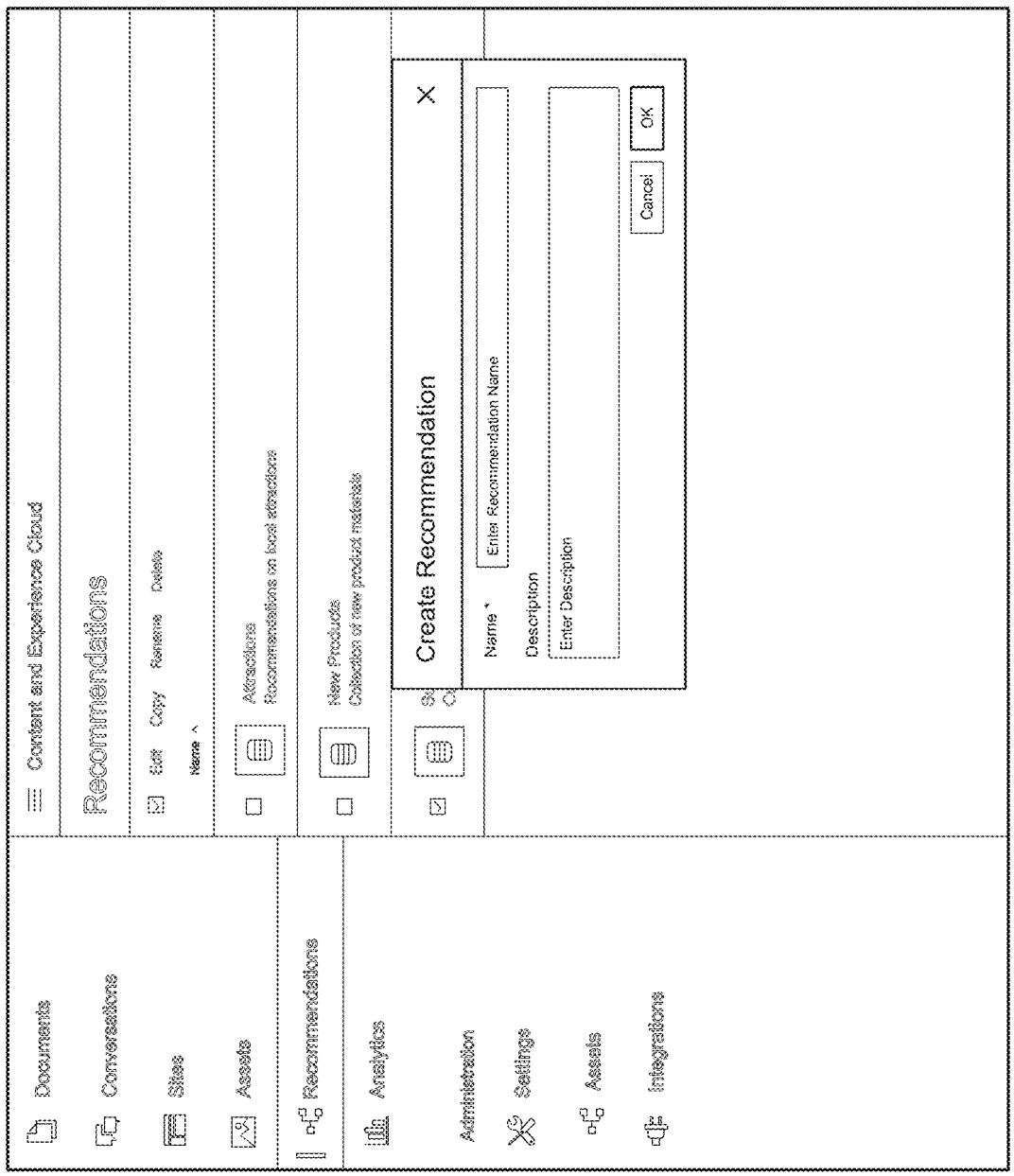
FIG. 11 illustrates an example of a graphical user interface, and usage thereof, for use with a system for delivery of content, in accordance with an embodiment.
Figure 12:
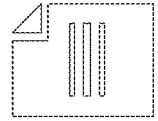
FIG. 12 illustrates another example of a graphical user interface, and usage thereof, for use with a system for delivery of content, in accordance with an embodiment.
Figure 13:
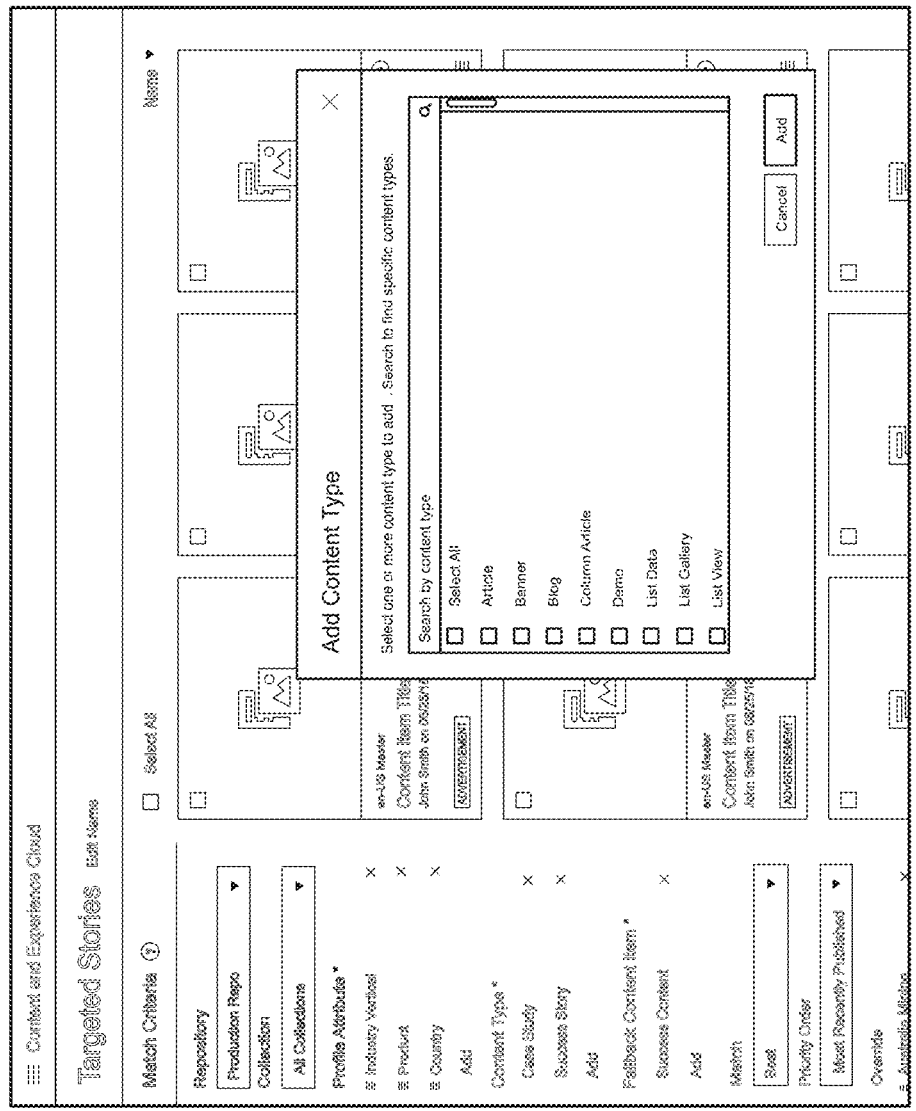
FIG. 13 illustrates another example of a graphical user interface, and usage thereof, for use with a system for delivery of content, in accordance with an embodiment.
Figure 23:
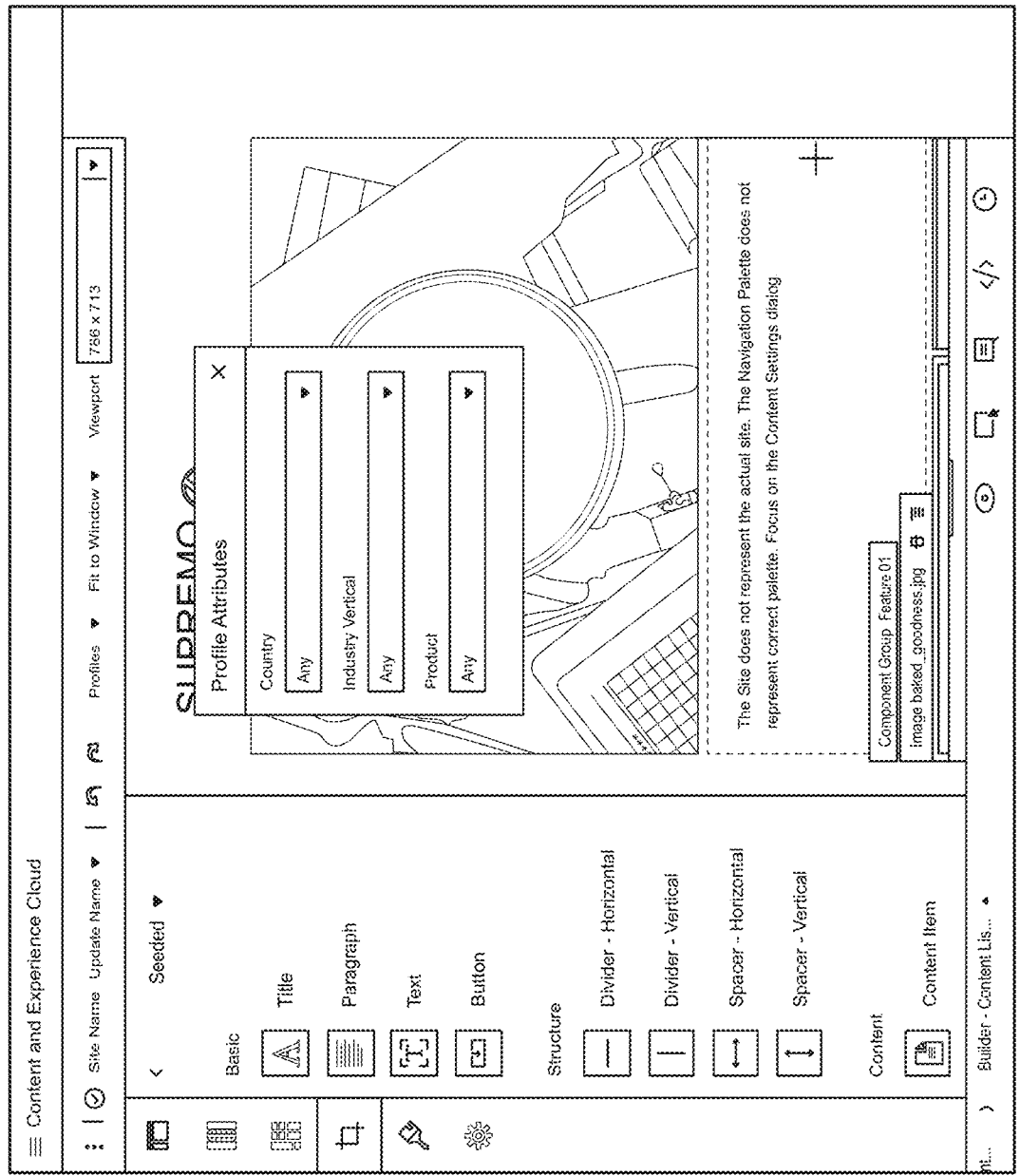
FIG. 23 illustrates another example of a graphical user interface, and usage thereof, for use with a system for delivery of content, in accordance with an embodiment.

As described above, in accordance with an embodiment and as illustrated in FIG. 10, a computer system that includes computer resources (e.g., processor/CPU, memory), and a graphical user interface, can be provided to enable an administrator to review and modify content mapping configurations, for use by the system, including the recommendation builder and recommendation engine as described above.

FIGS. 11-23 illustrate example graphical user interfaces, and usage thereof, for use in delivery of personalized content, in accordance with an embodiment.

As illustrated in FIGS. 11-23, in accordance with an embodiment, the graphical user interface can be used to, for example, create a recommendation, test (preview) the recommendation by profile, define overrides for the recommendation, create a custom profile, or preview a particular site by particular profile (e.g., impersonate a particular user interacting with the site).

For example, using the above approach, the system can be used to treat a crawler on an Internet as a particular user/person, and provide data in an aggregate form to the crawler, for use in for use in determining a search engine optimization score, or otherwise classifying the site.

In accordance with various embodiments, the teachings herein can be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although various embodiments as described above illustrate how the system can operate with, for example, an Oracle Content and Experience (OCE) environment, Oracle CX Unity environment, Oracle Infinity environment, Oracle Marketing Cloud (OMC) environment, or Eloqua environment, such examples are provided for purposes of illustration; and in accordance with various embodiments, the system can operate with other types of asset repository or database, content assets, content metadata, identity mapper and event tracker, user profile aggregator, or marketing automation environment The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for delivery of personalized content, comprising:
   a computer including a processor, memory, and content management system operable to provide access to a repository of content assets, said content assets having metadata associated therewith;

wherein the system operates to process requests, from client devices, for delivery of personalized content, including:
  determining a content channel and a user identity associated with a request for personalized content;
  aggregating, in association with the user identity, user profile information received from one or more user profile sources for the user identity;
  determining, by a recommendation engine, a particular content asset to deliver in response to the request, based on
    the content metadata associated with the content assets,
    the content channel associated with the request,
    a dynamically-determined user profile, based on a combination of the user profile information received from the user profile sources and a real-time tracking of events received in association with one or more user sessions, and
    rules governing matching of content asset metadata with user profiles;
  retrieving the particular content asset determined by the recommendation engine for delivery from the repository of content assets; and
  delivering the particular content asset to the client device via the content channel associated with the request.

2. The system of claim 1, wherein the recommendation engine operates according to a plurality of recommendation rules;
  wherein at delivery-time, in response to receipt of the request for personalized content, a plurality of attributes associated with the request are determined and passed to the recommendation engine, which:
    determines based on the request attributes and its recommendation rules, a set of best-matching content assets to be recommended, and
    passes a corresponding set of content asset identifiers to a recommendation service or application program interface, for use in delivering the content assets.

3. The system of claim 2, wherein the recommendation rules are provided as one or more taxonomy, tags, or semantic rules, that provide a continuum of targeting from rules with a more precise targeting continuing through rules associated with a precise targeting, and wherein a determination of the content assets to be recommended that best match the dynamically-determined user profile or the request attributes, is based at least on one or more of:
  a taxonomy of the content metadata associated with the content assets; or
  a semantic matching of the content metadata associated with the content assets.

4. The system of claim 1, wherein the dynamically-determined user profile is based at least partly on data aggregated from a plurality of profile sources and describing a user profile and user profile attributes received from the profile sources via a service provider interface and connector associated with each profile source.

5. The system of claim 1, wherein for each user of a plurality of users, the system tracks a user identity across a plurality of sessions or content channels, which information is then used in generating the dynamically-determined user profile.

6. The system of claim 1, further comprising a recommendation builder, including a plurality of interface screens that:
  receive as input, metadata associated with content assets;
  receive as input, definitions of types of user profiles;
  receive as input, definitions of recommendation rules;
  receive as input, definitions of a web or application content managed in the content management system, include one or more blog posts, articles, images, videos, banners, documents, frequently accessed questions, data records, lists, success stories that associates particular user profiles and user profile attributes with particular recommendations; and
  enable processing of different types of user profiles, recommendation rules, and success stories, against the content metadata associated with content assets, for displaying previews of the delivery of personalized content across different channels.

7. The system of claim 1, wherein the system enables search engine optimization of a website by treating a search engine crawler as one or more distinct profiles and serving distinct personalized content, which enables the search engine crawler to find distinct content, for determining a search engine optimization score for the site.

8. The system of claim 1, wherein comparison of user profile attributes with the content metadata associated with the content assets, and determination of one or more content assets to return in response to a request for personalized content is based on:
  a determination of content assets that exactly match a user profile, or
  a determination of content attributes that best match the user profile attributes; and
  determining a ranked collection of one or more content assets to return in response to a request for personalized content.

9. A method for delivery of personalized content, comprising:
  providing, at a content management system, access to a repository of content assets, said content assets having a metadata associated therewith; and
  processing requests, from client devices, for delivery of personalized content, including:
    determining a content channel and a user identity associated with a request for personalized content;
    aggregating, in association with the user identity, user profile information received from one or more user profile sources for the user identity;
    determining, by a recommendation engine, a particular content asset to deliver in response to the request, based on
      the content metadata associated with the content assets,
      the content channel associated with the request,
      a dynamically-determined user profile, based on a combination of the user profile information received from the user profile sources and a real-time tracking of events received in association with one or more user sessions, and
      rules governing matching of content asset metadata with user profiles;
    retrieving the particular content asset determined by the recommendation engine for delivery from the repository of content assets; and
    delivering the particular content asset to the client device via the content channel associated with the request.

10. The method of claim 9, wherein the recommendation engine operates according to a plurality of recommendation rules;

wherein at delivery-time, in response to receipt of the request for personalized content, a plurality of attributes associated with the request are determined and passed to the recommendation engine, which:
  determines based on the request attributes and its recommendation rules, a set of best-matching content assets to be recommended, and
  passes a corresponding set of content asset identifiers to a recommendation service or application program interface, for use in delivering the content assets.

11. The method of claim 10, wherein the recommendation rules are provided as one or more taxonomy, tags, or semantic rules, that provide a continuum of targeting from rules with a more precise targeting continuing through rules associated with a precise targeting, and wherein a determination of the content assets to be recommended that best match the dynamically-determined user profile or the request attributes, is based at least on one or more of:
  a taxonomy of the content metadata associated with the content assets; or
  a semantic matching of the content metadata associated with the content assets.

12. The method of claim 9, wherein the dynamically-determined user profile is based at least partly on data aggregated from a plurality of profile sources and describing a user profile and user profile attributes received from the profile sources via a service provider interface and connector associated with each profile source.

13. The method of claim 9, wherein for each user of a plurality of users, the system tracks a user identity across a plurality of sessions or content channels, which information is then used in generating the dynamically-determined user profile.

14. The method of claim 9, further comprising a recommendation builder, including a plurality of interface screens that:
  receive as input, metadata associated with content assets;
  receive as input, definitions of types of user profiles;
  receive as input, definitions of recommendation rules;
  receive as input, definitions of a web or application content managed in the content management system, include one or more blog posts, articles, images, videos, banners, documents, frequently accessed questions, data records, lists, success stories that associates particular user profiles and user profile attributes with particular recommendations; and
  enable processing of different types of user profiles, recommendation rules, and success stories, against the content metadata associated with content assets, for displaying previews of the delivery of personalized content across different channels.

15. The method of claim 9, wherein the system enables search engine optimization of a website by treating a search engine crawler as one or more distinct profiles and serving distinct personalized content, which enables the search engine crawler to find distinct content, for determining a search engine optimization score for the site.

16. The method of claim 9, wherein comparison of user profile attributes with the content metadata associated with the content assets, and determination of one or more content assets to return in response to a request for personalized content is based on:
  a determination of content assets that exactly match a user profile, or
  a determination of content attributes that best match the user profile attributes; and
  determining a ranked collection of one or more content assets to return in response to a request for personalized content.

17. A non-transitory computer readable storage medium, including instructions stored thereon which when read and executed by one or more computers cause the one or more computers to perform a method comprising:
  providing, at a content management system, access to a repository of content assets, said content assets having a metadata associated therewith; and
  processing requests, from client devices, for delivery of personalized content, including:
    determining a content channel and a user identity associated with a request for personalized content;
    aggregating, in association with the user identity, user profile information received from one or more user profile sources for the user identity;
    determining, by a recommendation engine, a particular content asset to deliver in response to the request, based on
      the content metadata associated with the content assets,
      the content channel associated with the request,
      a dynamically-determined user profile, based on a combination of the user profile information received from the user profile sources and a real-time tracking of events received in association with one or more user sessions, and
      rules governing matching of content asset metadata with user profiles;
    retrieving the particular content asset determined by the recommendation engine for delivery from the repository of content assets; and
    delivering the particular content asset to the client device via the content channel associated with the request.

18. The non-transitory computer readable storage medium of claim 17, wherein the recommendation engine operates according to a plurality of recommendation rules;
  wherein at delivery-time, in response to receipt of the request for personalized content, a plurality of attributes associated with the request are determined and passed to the recommendation engine, which:
    determines based on the request attributes and its recommendation rules, a set of best-matching content assets to be recommended, and
    passes a corresponding set of content asset identifiers to a recommendation service or application program interface, for use in delivering the content assets.

19. The non-transitory computer readable storage medium of claim 17, wherein the dynamically-determined user profile is based at least partly on data aggregated from a plurality of profile sources and describing a user profile and user profile attributes received from the profile sources via a service provider interface and connector associated with each profile source.

20. The non-transitory computer readable storage medium of claim 17, wherein for each user of a plurality of users, the system tracks a user identity across a plurality of sessions or content channels, which information is then used in generating the dynamically-determined user profile.

* * * * *